United States Patent
Florencio et al.

(10) Patent No.: US 11,562,588 B2
(45) Date of Patent: Jan. 24, 2023

(54) ENHANCED SUPERVISED FORM UNDERSTANDING

(71) Applicant: MICROSOFT TECHNOLOGY LICENSING, LLC, Redmond, WA (US)

(72) Inventors: Dinei Afonso Ferreira Florencio, Redmond, WA (US); Yu-Yun Dai, Duvall, WA (US); Cha Zhang, Bellevue, WA (US); Shih Chia Wang, New Taipei (TW)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 197 days.

(21) Appl. No.: 16/830,950

(22) Filed: Mar. 26, 2020

(65) Prior Publication Data

US 2021/0133438 A1  May 6, 2021

Related U.S. Application Data

(60) Provisional application No. 62/929,931, filed on Nov. 3, 2019.

(51) Int. Cl.
*G06V 30/412* (2022.01)
*G06K 9/62* (2022.01)
(Continued)

(52) U.S. Cl.
CPC ......... *G06V 30/412* (2022.01); *G06K 9/6254* (2013.01); *G06K 9/6257* (2013.01);
(Continued)

(58) Field of Classification Search
None
See application file for complete search history.

(56) References Cited

U.S. PATENT DOCUMENTS

2003/0152277 A1   8/2003  Hall et al.
2007/0150801 A1*  6/2007  Chidlovskii ......... G06K 9/6264
                                                          715/210

(Continued)

FOREIGN PATENT DOCUMENTS

EP   2275975 A2   1/2011

OTHER PUBLICATIONS

Hanafi MF, Mannino M, Abouzied A. A collaborative framework for structure identification over print documents. InProceedings of the Workshop on Human-in-the-Loop Data Analytics Jul. 5, 2019 (pp. 1-8). (Year: 2019).*

(Continued)

*Primary Examiner* — Emily C Terrell
*Assistant Examiner* — Nathan J Bloom
(74) *Attorney, Agent, or Firm* — Workman Nydegger

(57) ABSTRACT

Interfaces and systems are provided for harvesting ground truth from forms to be used in training models based on key-value pairings in the forms and to later use the trained models to identify related key-value pairings in new forms. Initially, forms are identified and clustered to identify a subset of forms to label with the key-value pairings. Users provide input to identify keys to use in labeling and then select/highlight text from forms that are presented concurrently with the keys in order to associate the highlighted text with the key(s) as the corresponding key-value pairing(s). After labeling the forms with the key-value pairings, the key-value pairing data is used as ground truth for training a model to independently identify the key-value pairing(s) in new forms. Once trained, the model is used to identify the key-value pairing(s) in new forms.

22 Claims, 36 Drawing Sheets

(51) Int. Cl.
G06F 3/04817 (2022.01)
G06V 30/10 (2022.01)
(52) U.S. Cl.
CPC ........ *G06K 9/6265* (2013.01); *G06F 3/04817* (2013.01); *G06V 30/10* (2022.01)

(56) References Cited

U.S. PATENT DOCUMENTS

| | | | |
|---|---|---|---|
| 2007/0203903 A1* | 8/2007 | Attaran Rezaei | G06F 16/904 |
| 2011/0007964 A1* | 1/2011 | Saund | G06K 9/6254 |
| | | | 382/162 |
| 2015/0019413 A1 | 1/2015 | Lazarus | |
| 2016/0179313 A1 | 6/2016 | Ho | |
| 2018/0246867 A1* | 8/2018 | Chiticariu | G06F 16/35 |
| 2019/0166823 A1* | 6/2019 | Dick | G06V 20/52 |
| 2019/0180094 A1* | 6/2019 | Zagaynov | G06K 9/6256 |
| 2020/0160086 A1* | 5/2020 | Florencio | G06K 9/6218 |
| 2020/0294287 A1* | 9/2020 | Schlemper | G06N 3/088 |

OTHER PUBLICATIONS

Hanafi, M. F. (May 2020). Human-in-the-loop Tools for Constructing and Debugging Data Extraction Pipelines (Doctoral dissertation, New York University Tandon School of Engineering). (Year: 2020).*

E. Saund, J. Lin and P. Sarkar, "PixLabeler: User Interface for Pixel-Level Labeling of Elements in Document Images," 2009 10th International Conference on Document Analysis and Recognition, Jul. 2009, pp. 646-650, doi: 10.1109/ICDAR.2009.250. (Year: 2009).*

Bernard J, Zeppelzauer M, Sedlmair M, Aigner W. VIAL: a unified process for visual interactive labeling. The Visual Computer. Sep. 2018;34(9):1189-207. (Year: 2018).*

Bernard, et al., "VIAL: A Unified Process for Visual Interactive Labeling", In Journal of The Visual Computer, vol. 34, Issue 9, Mar. 19, 2018, pp. 1189-1207.

Clausner, et al., "Aletheia—An Advanced Document Layout and Text Ground-Truthing System for Production Environments", In Proceeding of International Conference on Document Analysis and Recognition, Sep. 18, 2011, pp. 48-52.

Dey, et al., "Anveshak—A Groundtruth Generation Tool for Foreground Regions of Document Images", In Repository of arXiv:1708.02831v1, Aug. 9, 2017, 10 Pages.

"International Search Report and Written Opinion Issued in PCT Application No. PCT/US20/057433", dated Feb. 25, 2021, 15 Pages. (MS# 407833-WO-PCT).

Ramezani, et al., "Rapid Tagging and Reporting for Functional Language Extraction in Scientific Articles", In Proceedings of the 6th International Workshop on Mining Scientific Publications, Jun. 19, 2017, 6 Pages.

Yacoub, et al., "PerfectDoc: A Ground Truthing Environment for Complex Documents", In Proceedings of Eighth International Conference on Document Analysis and Recognition, Aug. 31, 2005, 5 Pages.

* cited by examiner

ENHANCED SUPERVISED FORM UNDERSTANDING

CROSS-REFERENCE TO RELATED APPLICATIONS

This application claims the benefit of and priority to U.S. Provisional Patent Application Ser. No. 62/929,931 filed on Nov. 3, 2019 and entitled "ENHANCED SUPERVISED FORM UNDERSTANDING," which application is expressly incorporated herein by reference in its entirety.

BACKGROUND

Computers and computing systems have affected nearly every aspect of modern living. Computers are generally involved in work, recreation, healthcare, transportation, entertainment, household management, etc. Many of these industries utilize forms, including printed forms that include data that can be stored, analyzed and processed.

It can be difficult and time consuming to manually replicate the data on the forms in a manner that the data can be utilized in a beneficial manner. Accordingly, some applications have been created to automatically scan and parse out the data contained in written forms, so that the data can be indexed, stored and processed in a desired manner. For instance, optical character recognition (OCR) applications have been created to convert a scanned image or document into identifiable text and characters.

In some instances, it is desirable to further enable applications to parse the forms that have undergone OCR processing to identify desired content within the forms. For instance, it could be beneficial to identify the value(s) corresponding to the particular type(s) of content that are of interest to a user that is in receipt of the forms (e.g., a price, a date, a name, or any other element) that is contained within the form and that can be indexed and stored for further analysis and processing.

Unfortunately, OCR by itself does not determine correlation between text and corresponding fields in a form. When performing OCR on forms and attempting to determine which text corresponds to related fields, in order to achieve reliable results, existing system may require that a specific location be provided for each field in the form, and it may typically be required that a substantially uniform form be used, in order to make the determination.

However, there are many different types of forms that have a significant disparity in both type and formatting of the text and the form fields. This can make it difficult for existing applications that perform OCR processing and other processing of forms to intelligently identify and reconcile the similarities and differences between the forms in such a manner that is necessary to identify and index the specific content contained within the forms. Additional factors further exacerbate the problem, such as, but not limited to the variations in the completeness and format of the data that is entered into the forms, as well as the variations in the techniques that are used to scan/image the forms and the resulting variations in the qualities of the scanned/imaged forms.

For instance, it is not hard to recognize the problems that can be encountered by an application attempting to process and reconcile the data from different forms, such as a first form that is a saved perspective camera image of a printed form, another form that is a machine scanned image of a printed form that was misaligned during the scanning process, and other forms that are only partially completed and or completed by different users that have entered the form data in different formats or styles. Existing systems and applications struggle with the ability to overcome these problems.

In view of the foregoing, there is an ongoing need and desire to provide improved techniques and systems for processing forms and the data contained within the forms, as well as for interfaces the improve a user's control and ability for facilitating the training and tuning of these systems.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Disclosed embodiments include systems, methods and interfaces for performing optical character recognition for forms.

Disclosed embodiments also include systems, methods and interfaces for clustering forms and for selecting forms to use for developing ground truth for training models that can be used to process and identify content contained within forms, as well as for identifying the ground truth for the key-pair data that will be used to identify the content in subsequently processed forms.

In such embodiments, for example, a plurality of forms is identified and clustered to identify a subset of forms to label with the key-value pairings. Then, interfaces are used to present the forms to users who provide input to identify keys to use in labeling and to select/highlight text from the subset of forms that are presented concurrently with the keys in order to associate the highlighted text in the forms with the identified key(s) as the corresponding key-value pairing(s). After labeling the forms with the key-value pairings, the key-value pairing data is used as ground truth for training a model to independently identify the key-value pairing(s) in new forms. Once trained, the model is used to identify the key-value pairing(s) in new forms.

Disclosed embodiments also include systems, methods and interfaces for updating and tuning the models and for applying the models to subsequently processed forms to identify and index content within the forms based on the ground truth.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIGS. 16-24 illustrate various non-limiting examples of interfaces that can be used for processing forms, for identify ground truth for training models that can be used to analyze forms for identifying content within the forms;

Figure 33:
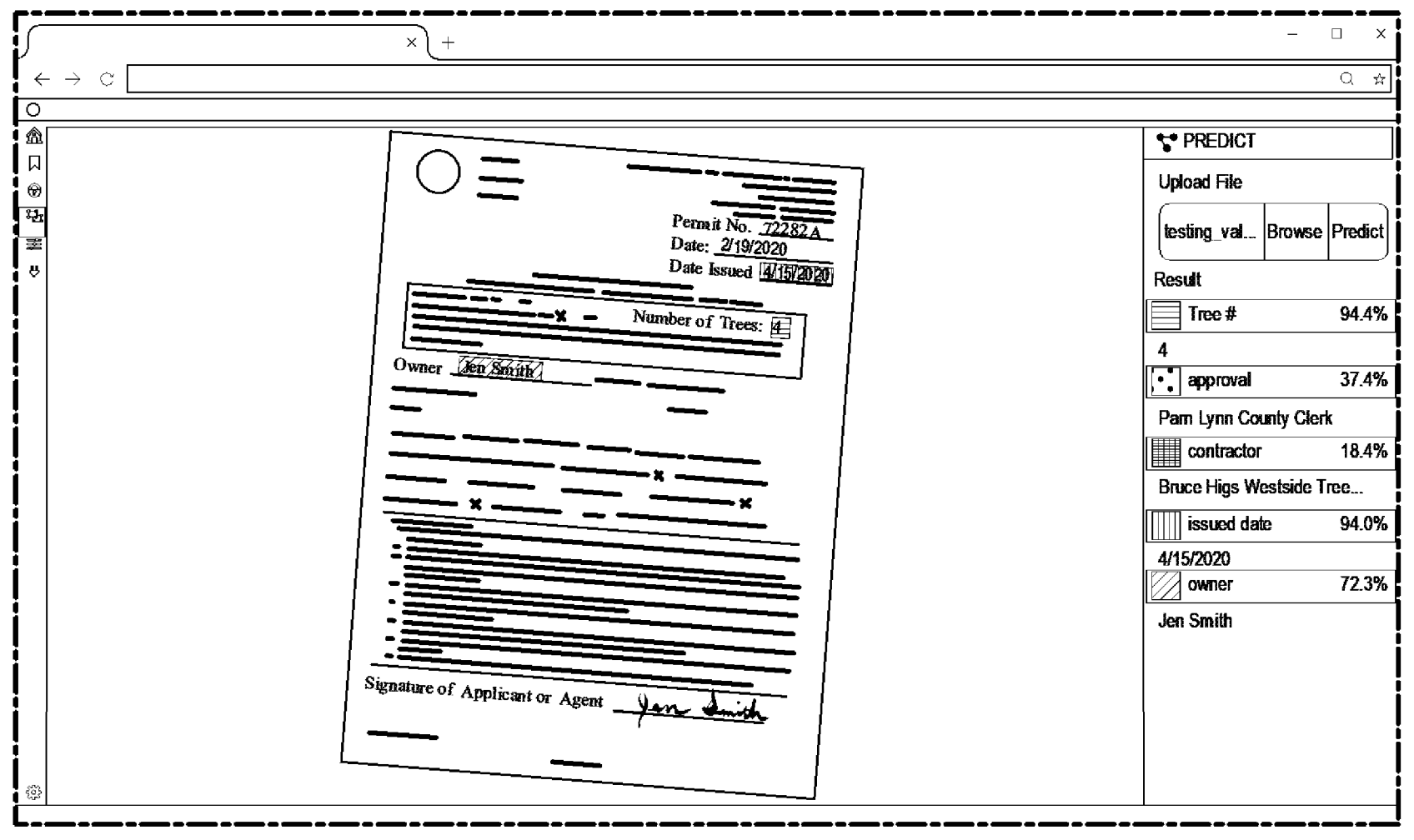

FIGS. 27-33 illustrate various non-limiting examples of interfaces that can be used for applying a trained model, which has been trained with key-value pairs using the other interfaces described herein, to identify values in related forms having similar keys to the forms that were used for training the model;

FIG. 35 illustrates a non-limiting example of an interface that can be used for processing forms and for applying trained models to the forms to identify content within the forms that correspond to particular keys that the trained model is aware of.

DETAILED DESCRIPTION

Figure 1:
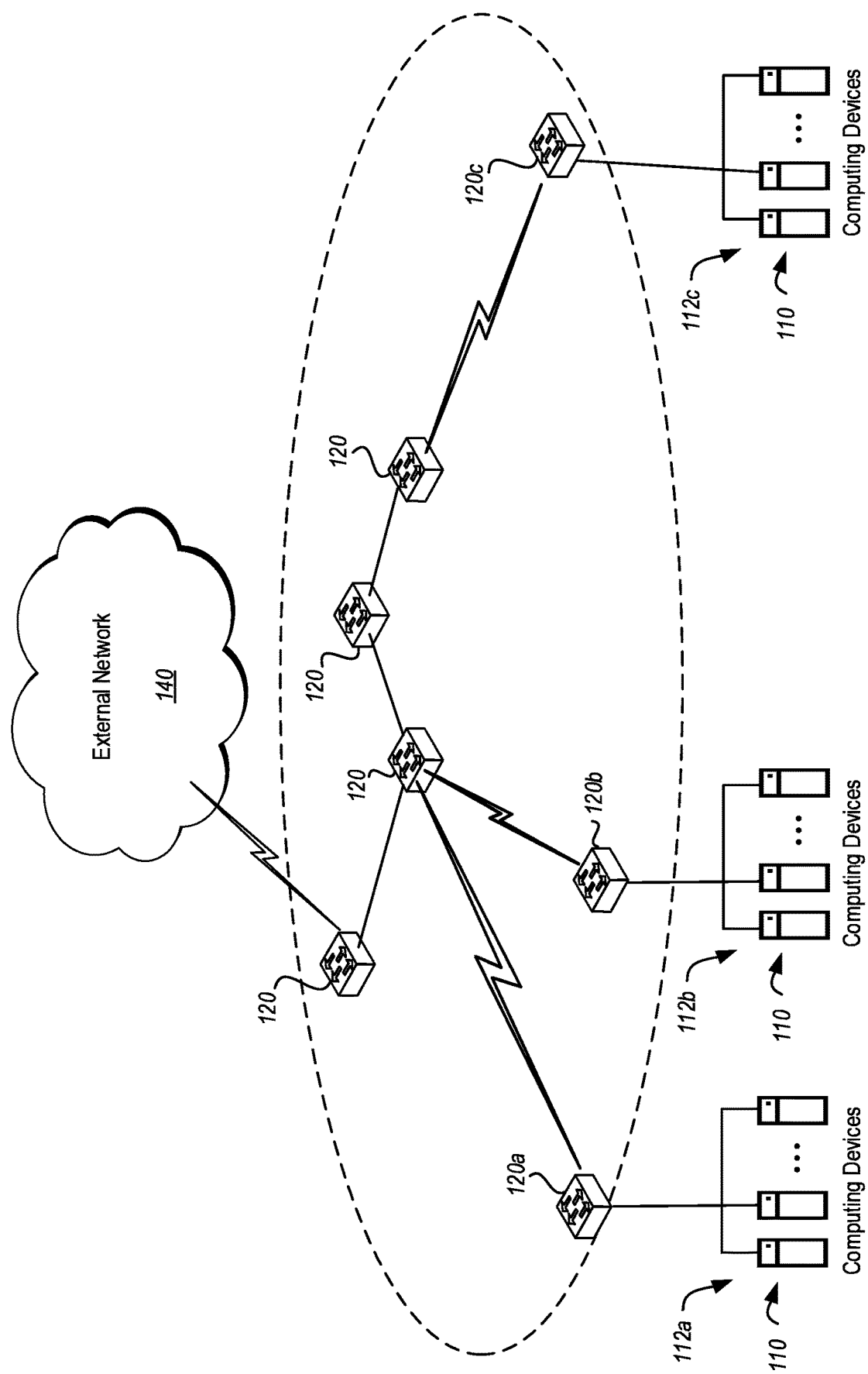
FIG. 1 is a block diagram illustrating one example of a suitable environment in which aspects of the technology may be employed.

Disclosed embodiments provide systems, methods and interfaces that can be used to perform OCR processing and subsequent analysis to forms and the data contained within the forms. These systems, methods and interfaces can be used to facilitate a user's control over and to improve a user's experience with the selection of ground truth for training and tuning the models used to process the forms, as well as for reviewing the processing performed on forms by the models, as will be described throughout.

In some instances, the disclosed embodiments provide systems, methods, and interfaces for mitigating and/or addressing the problems related to inconsistencies in form type, completeness, quality and so forth. For instance, some embodiments provide systems, methods and interfaces that can be used to address or mitigate problems associated with forms comprising saved perspective camera images, misalignment in forms, partially completed forms, variations in data formats and styles, and other variations in form and form data.

The following description provides specific details for a thorough understanding of, and enabling description for, various examples of the technology. One skilled in the art will understand that the technology may be practiced without many of these details. In some instances, well-known structures and functions have not been shown or described in detail to avoid unnecessarily obscuring the description of examples of the technology. It is intended that the terminology used in this disclosure be interpreted in its broadest reasonable manner, even though it is being used in conjunction with a detailed description of certain examples of the technology. Although certain terms may be emphasized below, any terminology intended to be interpreted in any restricted manner will be overtly and specifically defined as such in this Detailed Description section. Throughout the specification and claims, the following terms take at least the meanings explicitly associated herein, unless the context dictates otherwise. The meanings identified below do not necessarily limit the terms, but merely provide illustrative examples for the terms. For example, each of the terms "based on" and "based upon" is not exclusive, and is equivalent to the term "based, at least in part, on", and includes the option of being based on additional factors, some of which may not be described herein. As another example, the term "via" is not exclusive, and is equivalent to the term "via, at least in part", and includes the option of being via additional factors, some of which may not be described herein. The meaning of "in" includes "in" and "on." The phrase "in one embodiment," or "in one example," as used herein does not necessarily refer to the same embodiment or example, although it may. Use of particular textual numeric designators does not imply the existence of lesser-valued numerical designators. For example, reciting "a widget selected from the group consisting of a third foo and a fourth bar" would not itself imply that there are at least three foo, nor that there are at least four bar, elements. References in the singular are made merely for clarity of reading and include plural references unless plural references are specifically excluded. The term "or" is an inclusive "or" operator unless specifically indicated otherwise. For example, the phrases "A or B" means "A, B, or A and B." As used herein, the terms "component" and "system" are intended to encompass hardware, software, or various combinations of hardware and software. Thus, for example, a system or component may be a process, a process executing on a computing device, the computing device, or a portion thereof.

Briefly stated, the disclosed technology is generally directed to optical character recognition for forms and corresponding interfaces and systems for selecting forms for processing, for processing the forms to identify ground truth, for training models with the ground truth, and for tuning and/or applying the trained models with/for subsequently processed forms.

In one example of the technology, optical character recognition is performed on a plurality of forms. In some examples, the forms of the plurality of forms include at least one type of form. In some examples, anchors are determined for the forms, including corresponding anchors for each type of form of the plurality of forms. In some examples, feature rules are determined, including corresponding feature rules for each type of form of the plurality of forms. In some examples, features and labels are determined for each form of the plurality of forms. In some examples, a training model is generated based on a ground truth that includes a plurality of key-value pairs corresponding to the plurality of forms, and further based on the determined features and labels for the plurality of forms.

Training may be performed from custom forms so that future forms can be OCR'ed (e.g., undergo Optical Character Recognition) in such a way that that key-value pairs are generated for or from the future forms. In some examples, the keys are elements for which users wish to know corresponding values based on the input form. For instance, an example key might be "customer name" and the corresponding value might be "John Smith." As another example, an example key might be "invoice date" and the corresponding value might be "5/7/18." As another example, an example key might be "balance due" and the corresponding value might be "$984.96."

The training may be accomplished with a set of forms that includes types of forms that may be processed in the future, along with a ground truth that includes the correct key-value pair for each form. The training process may output a model based on machine learning and may also output other elements such as a language model, extraction rules, anchors for one or more types of forms, and/or feature rules. The model and other elements output by the training process may be used to perform OCR on such forms in the future and generate key-value pairs for these forms where the key-value pairs are not known in advance.

To facilitate the identification of the ground truth, interfaces are provided and presented with selectable controls and input fields for suggesting/receiving input that can be used for labeling or otherwise identifying key-value pairs for the ground truth from the forms. In some instances, the systems also intelligently suggest/select the forms to use in the labeling processes to improve or increase the accuracy and performance of the model that is subsequently trained/tuned with the ground truth and to help compensate for, for instance, the variations in form and form data that the model is subsequently applied to.

Illustrative Devices/Operating Environments

FIG. 1 is a diagram of environment 100 in which aspects of the technology may be practiced. As shown, environment 100 includes computing devices 110, as well as network nodes 120, connected via network 130. Even though particular components of environment 100 are shown in FIG. 1, in other examples, environment 100 can also include additional and/or different components. For example, in certain examples, the environment 100 can also include network storage devices, maintenance managers, and/or other suitable components (not shown). Computing devices 110 shown in FIG. 1 may be in various locations, including on premise, in the cloud, or the like. For example, computer devices 110 may be on the client side, on the server side, or the like.

As shown in FIG. 1, network 130 can include one or more network nodes 120 that interconnect multiple computing devices 110, and connect computing devices 110 to external network 140, e.g., the Internet or an intranet. For example, network nodes 120 may include switches, routers, hubs, network controllers, or other network elements. In certain examples, computing devices 110 can be organized into racks, action zones, groups, sets, or other suitable divisions. For example, in the illustrated example, computing devices 110 are grouped into three host sets identified individually as first, second, and third host sets 112a-112c. In the illustrated example, each of host sets 112a-112c is operatively coupled to a corresponding network node 120a-120c, respectively, which are commonly referred to as "top-of-rack" or "TOR" network nodes. TOR network nodes 120a-120c can then be operatively coupled to additional network nodes 120 to form a computer network in a hierarchical, flat, mesh, or other suitable types of topology that allows communications between computing devices 110 and external network 140. In other examples, multiple host sets 112a-112c may share a single network node 120. Computing devices 110 may be virtually any type of general- or specific-purpose computing device. For example, these computing devices may be user devices such as desktop computers, laptop computers, tablet computers, display devices, cameras, printers, or smartphones. However, in a data center environment, these computing devices may be server devices such as application server computers, virtual computing host computers, or file server computers. Moreover, computing devices 110 may be individually configured to provide computing, storage, and/or other suitable computing services.

The disclosed and claimed embodiments may be incorporated in and/or be implemented by one or more of the computing devices 110.

Illustrative Computing Device

Figure 2:
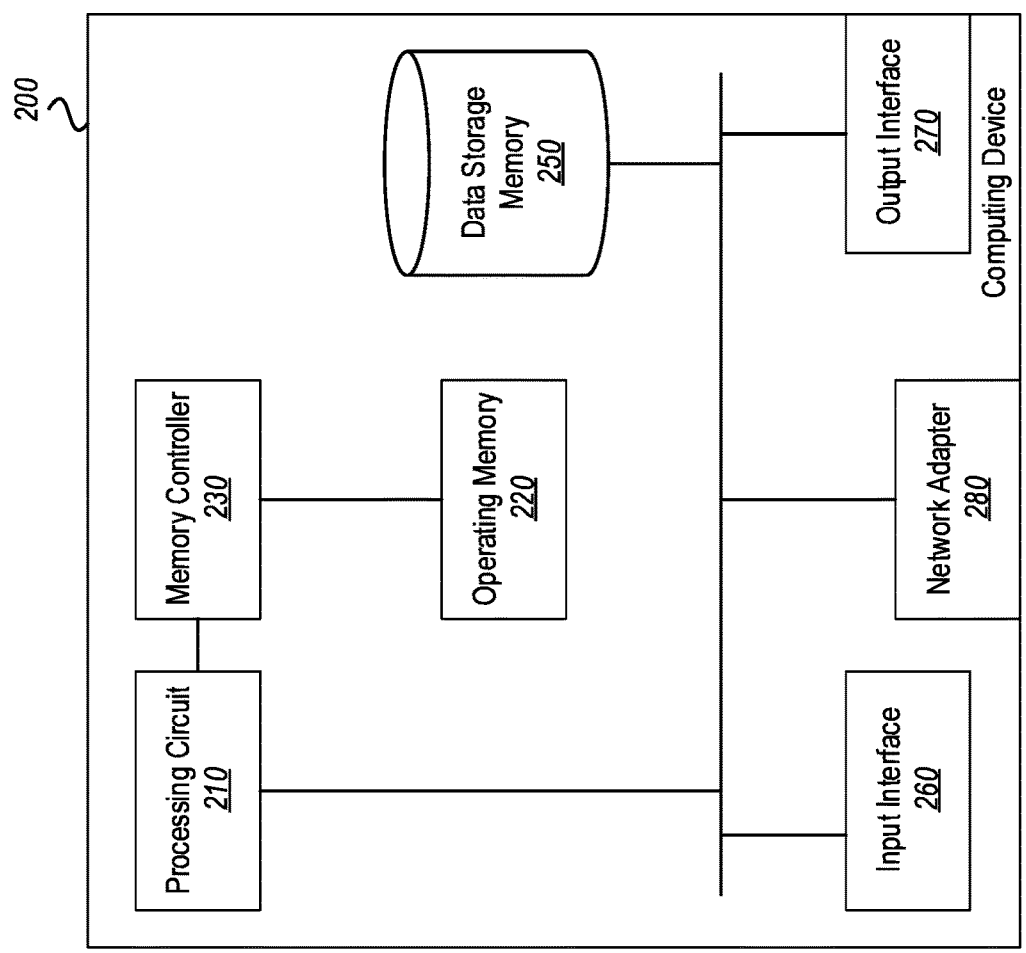
FIG. 2 is a block diagram illustrating one example of a suitable computing device according to aspects of the disclosed technology.

FIG. 2 is a diagram illustrating one example of computing device 200 in which aspects of the technology may also be practiced. Computing device 200 may be virtually any type of general- or specific-purpose computing device. For example, computing device 200 may be a user device such as a desktop computer, a laptop computer, a tablet computer, a display device, a camera, a printer, or a smartphone. Likewise, computing device 200 may also be server device such as an application server computer, a virtual computing host computer, or a file server computer, e.g., computing device 200 may be an example of computing device 110 or network node 120 of FIG. 1. Likewise, computer device 200 may be an example any of the devices illustrated in or referred to in FIGS. 3-5, as discussed in greater detail below. As illustrated in FIG. 2, computing device 200 includes processing circuit 210, operating memory 220, memory controller 230, data storage memory 250, input interface 260, output interface 270, and network adapter 280. Each of these afore-listed components of computing device 200 includes at least one hardware element.

Computing device 200 includes at least one processing circuit 210 configured to execute instructions, such as instructions for implementing the herein-described workloads, processes, or technology. Processing circuit 210 may include a microprocessor, a microcontroller, a graphics processor, a coprocessor, a field-programmable gate array, a programmable logic device, a signal processor, or any other circuit suitable for processing data. Processing circuit 210 is an example of a core. The aforementioned instructions, along with other data (e.g., datasets, metadata, operating system instructions, etc.), may be stored in operating memory 220 during run-time of computing device 200.

Operating memory 220 may also include any of a variety of data storage devices/components, such as one or more non-volatile memories, volatile memories, semi-volatile memories, random access memories, static memories, caches, buffers, or other media used to store run-time information. In one example, operating memory 220 is volatile and does not retain information when computing device 200 is powered off. Rather, computing device 200 may be configured to transfer instructions from a non-volatile data storage component (e.g., data storage component 250) to operating memory 220 as part of a booting or other loading process. In some examples, other forms of execution may be employed, such as execution directly from data storage component 250, e.g., eXecute In Place (XIP).

Operating memory 220 may include 4th generation double data rate (DDR4) memory, 3rd generation double data rate (DDR3) memory, other dynamic random access memory (DRAM), High Bandwidth Memory (HBM), Hybrid Memory Cube memory, 3D-stacked memory, static random access memory (SRAM), magnetoresistive random access memory (MRAM), pseudorandom random access memory (PSRAM), or other memory, and such memory may comprise one or more memory circuits integrated onto a DIMM, SIMM, SODIMM, Known Good Die (KGD), or other packaging. Such operating memory modules or devices may be organized according to channels, ranks, and banks. For example, operating memory devices may be coupled to processing circuit 210 via memory controller 230 in channels. Operating memory within a rank may operate with a shared clock, and shared address and command bus. Also, an operating memory device may be organized into several banks where a bank can be thought of as an array addressed by row and column. Based on such an organization of operating memory, physical addresses within the operating memory may be referred to by a tuple of channel, rank, bank, row, and column.

In view of the above-discussion, it will be appreciated that the operating memory 220 includes hardware and should not, therefore be construed as mere communications media or signals per se.

Memory controller 230 is configured to interface processing circuit 210 to operating memory 220. For example, memory controller 230 may be configured to interface commands, addresses, and data between operating memory 220 and processing circuit 210. Memory controller 230 may also be configured to abstract or otherwise manage certain aspects of memory management from or for processing circuit 210. Although memory controller 230 is illustrated as single memory controller separate from processing circuit 210, in other examples, multiple memory controllers may be employed, memory controller(s) may be integrated with operating memory 220, or the like. Further, memory controller(s) may be integrated into processing circuit 210. These and other variations are possible.

In computing device 200, data storage memory 250, input interface 260, output interface 270, and network adapter 280 are interfaced to processing circuit 210 by bus 240. Although, FIG. 2 illustrates bus 240 as a single passive bus, other configurations, such as a collection of buses, a collection of point to point links, an input/output controller, a bridge, other interface circuitry, or any collection thereof may also be suitably employed for interfacing data storage memory 250, input interface 260, output interface 270, or network adapter 280 to processing circuit 210.

In computing device 200, data storage memory 250 is employed for long-term non-volatile data storage. Data storage memory 250 may include any of a variety of non-volatile data storage devices/components, such as non-volatile memories, disks, disk drives, hard drives, solid-state drives, or any other media that can be used for the non-volatile storage of information. Accordingly, data storage memory 250 should not be construed as mere communications media or signals per se. In contrast to operating memory 220, data storage memory 250 is employed by computing device 200 for non-volatile long-term data storage, instead of for run-time data storage.

Also, computing device 200 may include or be coupled to any type of processor-readable media such as processor-readable storage media (e.g., operating memory 220 and data storage memory 250) and communication media (e.g., communication signals and radio waves). While the term processor-readable storage media includes operating memory 220 and data storage memory 250, the term "processor-readable storage media," throughout the specification and the claims whether used in the singular or the plural, is defined herein so that the term "processor-readable storage media" specifically excludes and does not encompass communications media, any communications medium, or any signals per se. However, the term "processor-readable storage media" does encompass processor cache, Random Access Memory (RAM), register memory, and/or the like.

Computing device 200 also includes input interface 260, which may be configured to enable computing device 200 to receive input from users or from other devices. In addition, computing device 200 includes output interface 270, which may be configured to provide output from computing device 200. In one example, output interface 270 includes a frame buffer, graphics processor, graphics processor or accelerator, and is configured to render displays for presentation on a separate visual display device (such as a monitor, projector, virtual computing client computer, etc.). In another example, output interface 270 includes a visual display device and is configured to render and present displays for viewing. In yet another example, input interface 260 and/or output interface 270 may include a universal asynchronous receiver/transmitter ("UART"), a Serial Peripheral Interface ("SPI"), Inter-Integrated Circuit ("I2C"), a General-purpose input/output (GPIO), and/or the like. Moreover, input interface 260 and/or output interface 270 may include or be interfaced to any number or type of peripherals. In some examples, one or more input interfaces 260 may be used to directly connect to imaging devices. For example, computing device 200 may be connected to a camera, scanner, or other imaging device. Computing device 200 may also receive images from other computing devices.

In the illustrated example, computing device 200 is configured to communicate with other computing devices or entities via network adapter 280. Network adapter 280 may include a wired network adapter, e.g., an Ethernet adapter, a Token Ring adapter, or a Digital Subscriber Line (DSL) adapter. Network adapter 280 may also include a wireless network adapter, for example, a Wi-Fi adapter, a Bluetooth adapter, a ZigBee adapter, a Long Term Evolution (LTE) adapter, SigFox, LoRa, Powerline, or a 5G adapter.

Although computing device 200 is illustrated with certain components configured in a particular arrangement, these components and arrangement are merely one example of a computing device in which the technology may be employed. In other examples, data storage memory 250, input interface 260, output interface 270, or network adapter 280 may be directly coupled to processing circuit 210, or be coupled to processing circuit 210 via an input/output controller, a bridge, or other interface circuitry. Other variations of the technology are possible.

Some examples of computing device 200 include at least one memory (e.g., operating memory 220) adapted to store run-time data and at least one processor (e.g., processing unit 210) that is adapted to execute processor-executable code that is stored by the system or a remote system and that, in response to execution, enables computing device 200 to incorporate and/or perform actions, such as the disclosed and claimed embodiments. The system is also configured to stores all of the data structures (e.g., forms, key-value pairings/indices, models, etc.) within the system storage and/or to obtain these data structures remotely from one or more remote systems.

Illustrative System

Figure 3:
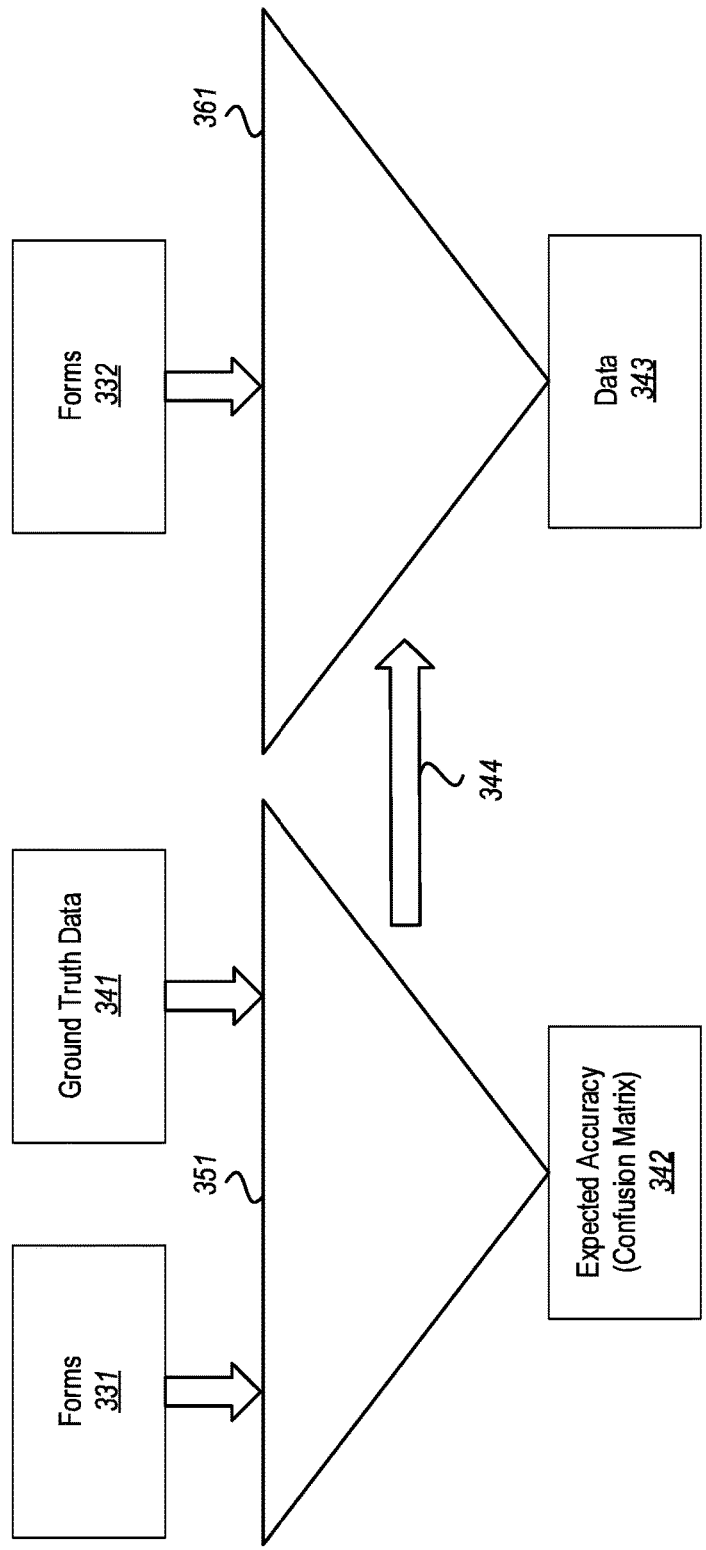
FIG. 3 is a functional block diagram illustrating an example of a system.

FIG. 3 is a functional block diagram of an example system 300. System 300 may include forms 331, forms 332, ground truth data 341, expected accuracy data 342, key-value data 343, model 344, training pipeline 351, and service pipeline 361.

System 300 may be used to perform OCR on forms for which the user wishes to also know the values of particular keys as part of the output of the OCR process. For example, forms may include customer name, and for such forms, the user may wish to know what customer name is indicated on a particular form, and so output "customer name," the key, along with the corresponding value for the customer name indicated on the form. There may be several such key-value pairs in each form that users wish to be output by the OCR process. In some examples, the key-value pairs are presented in a hierarchical form, such as one or more tables.

In some examples, forms 332 are forms for which the OCR process is to be performed along with key-value determinations made. In some examples, forms 331 may be past forms of the same type or types as forms 332, such as forms from a previous quarter, a previous year, or the like.

The training process may make use of forms 331, which may include forms of one or more types with which the user may wish to, in the future, OCR forms of the same one or more types along with output key-value pairs. Training pipeline 351 may perform training based on forms 331, along with ground truth data 341. In some examples, ground truth data 341 includes, for each of the forms in 331, correct key-value pairs for the form. These pairs can be identified through interfaces that enable a user to identify keys and to label values in selected forms that correspond to those keys, as will be described in more detail below.

Training pipeline 351 may output model 344 and expected accuracy data 342 based on the training. In some examples, model 344 may include a machine learning model for generating key-value pairs from features derived from input forms, and may also include a language model, extraction rules, anchors for one or more forms from among forms 331, and feature rules. Expected accuracy data 342 may include information about the expected accuracy of model 344 in deriving key-value pairs from forms 332, including, in some examples, a confusion matrix.

In some examples, forms 332 are forms to be processed once the training is complete, to perform OCR along with outputting the key-value pairs. After the training is accomplished, service pipeline 361 may be used to perform OCR on forms 332, along with predicting the desired key-values pairs, as key-value data 343, based on model 344.

Figure 4:
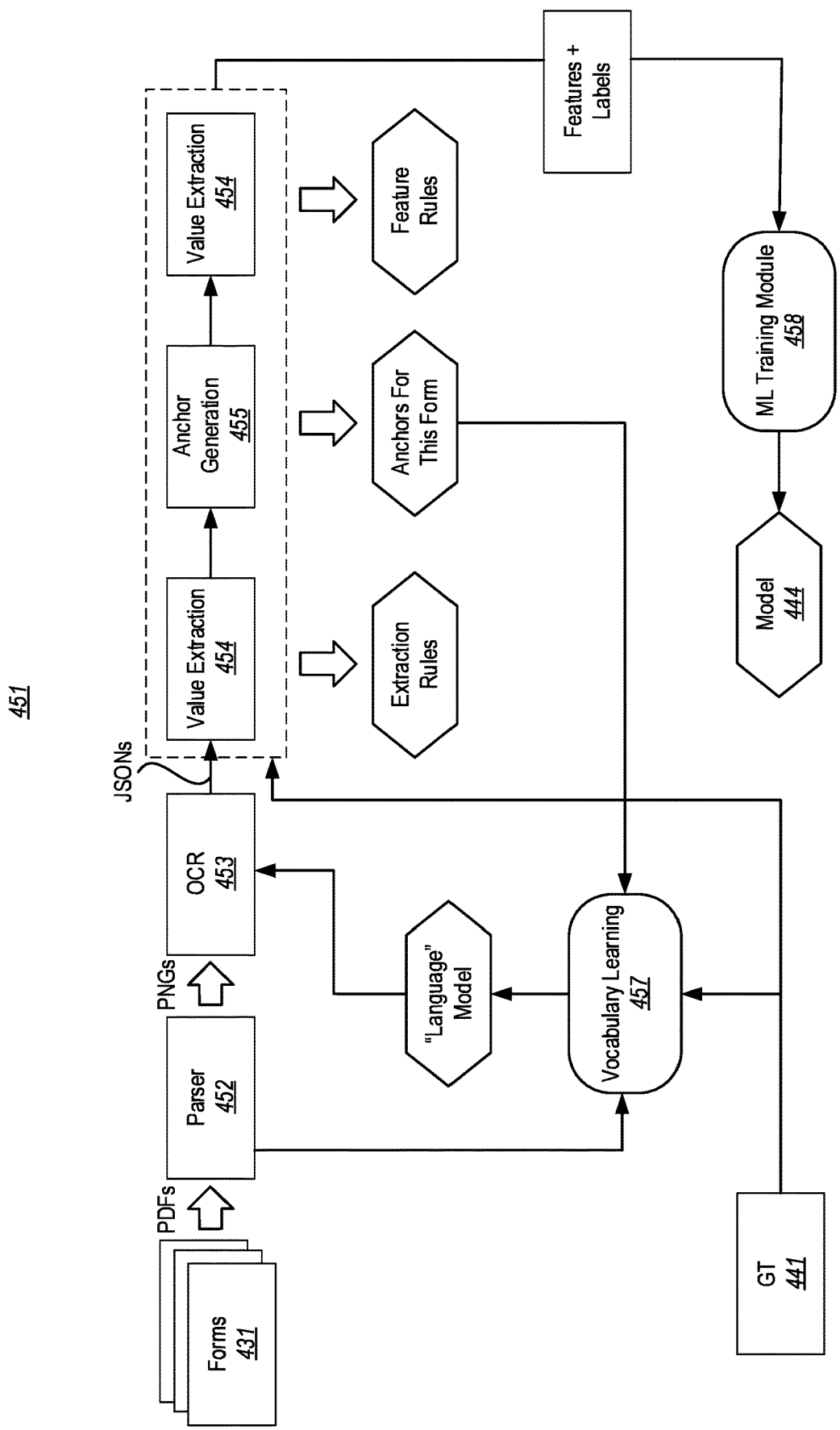
FIG. 4 is a functional block diagram illustrating an example training pipeline.

FIG. 4 is a functional diagram illustrating an example training pipeline (451), which may be employed as an example of training pipeline 351 of FIG. 3. Training pipeline 451 may include Parsing block 452, OCR block 453, value extraction block 454, anchor generation block 455, feature generation block 456, vocabulary learning block 457, and machine-learning training module 458.

Parsing block 452 may be configured to receive forms 431 and to parse forms 431. Forms 431 may be formatted as portable documents, for example, in Portable Document Format (PDF), and/or any other parsible document format. The output of parsing block 452 may be in a raster graphics file format, such as Portable Network Graphics (PNG), or in another suitable format. OCR block 453 may be configured to perform optical character recognition on the output of parsing block 452. OCR block 453 may also output the locations of visual elements not traditional classified as text. This may include lines, checkboxes, location of logos or images, and other image elements. OCR block 453 may output the forms as documents that include a text format, such as JavaScriptObjectNotation (JSON) and/or any other format that enables text, strings or other key values to be identified and associated with corresponding keys.

Value extraction block 454 may receive Ground Truth 441 and the output of OCR block 453. The Ground Truth 441 may be identified and stored as key-value pairs that are identified by a user and/or obtained from a third party system. In some instances, the key-value pairs are identified using the interfaces and processes described herein.

The value extraction block 454 is also configured to modify the documents to include line breaks and to change orientation, scaling, perspective and other styling of the forms to normalize or rectify differences between different forms and/or form data. Value extraction block 454 may also generate extraction rules from the forms that value extraction block 454 processes. The extraction rules may include rules for adding line breaks to the data and/or for making other modifications to the forms.

In some examples, learning line breaks from the data includes, given the training data, finding break points that separate keys from values. That is, in these examples, value extraction block 454 separates the data into lines. A line may have one word, or may have more than one word. In some examples, this is accomplished by first finding the "values" in the text of the form, as indicated as such according to the Ground Truth 441. A list called, for example, List A may be generated, and text previous to the determined values may be added to list A. Next, in some examples, for each element in List A, the element is removed from List A if the element contains any GT "values" other than at end of GT value (this would break those values into two fields). Next, in some examples, List A is used to split lines into two lines (fields).

Anchor generation block 455 may receive the document with lines breaks added from value extraction block 454, and may determine anchors for the particular type of form according to the current form. Anchors, in these examples, are fields that would appear in the empty form for the current form. For example, a form may have been filled out from an empty form, where the empty form is the version of the form that exists before the form is filled out. Even if the empty form itself it not accessible, it may be possible to determine or approximately determine the empty form based on, among other things, the intersection of several forms of the same type. The fields present in the determined empty form are defined as anchors.

In addition to determining lines that are anchors, anchor generation block 455 may also determine other kinds of anchors, including other visuals cues, such as, for example, visual features, tables corners, and/or the like. This can be particularly helpful for determining the orientation, perspective, scaling or other attributes of a form and/or for determining when to make modifications to the form to rectify and/or compensate for differences between different forms. This can also help to, thereby, identify relative positioning of the key-value data within the forms relative to other form components/anchors. Such relative positioning information and other form and key-value positioning attribute data can be stored as metadata with the form or in a separate data structure, which can be used by the models as supplemental ground truth for identifying location of similar key-value data during subsequent processing with the model on other forms, for example.

Forms 431 may include different types of forms in different examples. In some examples, forms 431 are all forms of the same type. In some examples, forms 431 may include multiple different types of forms, possibly with outliers, but with most forms belonging to one of several types of forms of which multiple instances of each type of form are included. Other combinations of types of forms may be included in forms 431 in various examples.

In some examples, form clustering may be used to separate the forms into separate types of forms and/or into clusters based on forms of a same type but that have other similarities in attributes that vary between the forms, and/or based on clusters of forms based on form source, or form completeness, content, etc. In some examples, rather than using automatic form clusters, the type of form may be an input parameter by the user.

In some instances, the clustering mapping of the forms is stored in a data structure by the system or that is accessible by the system. The clustering can be particularly helpful when selecting forms (automatically or manually) for training a model. In particular, the system can identify a variety of different forms (even from the same type or different types), that have different attributes of completeness, quality, orientation, data format/style, and so forth, to ensure that there is a broad range of variability in the attributes/features (e.g., location, formatting, style) of the key-value data of the forms that are to be used for creating the ground truth so that the model can be robustly designed to handle the processing of such variability when the model is used to subsequently process forms to identify the values of the related/desired keys.

The system may intelligently pick different forms based on the variability of form/data features based on the rules to accommodate different confidence/accuracy thresholds for particular keys. For instance, the system may determine that a selection of a first set of forms to use for training the model will result in a certain threshold of accuracy/confidence when processing future forms for a particular first key-value pairing, but a lower accuracy/confidence when processing the future forms for a different key-value pairing. In such instances, the system may identify/prioritize different forms from the grouping of available forms to select a form having enough variability and/or similarity in a particular key-value pairing to increase the accuracy/confidence of the model for predicting/identifying that key-value pairing on subsequent forms. This determination may be made using any suitable algorithm and statistical analysis of the forms and may be done iteratively and dynamically during the training process.

In some examples, one or more empty forms may be included in forms 431 and specifically designated as empty forms. In this case, the empty form may be used to determine anchors. If specifically designated empty forms are not present, the anchor generation may in essence determine the empty forms, based on the ground truth and on analysis of similarities between forms which are of the same or a similar type. For example, as part of the anchor determination, a histogram may be used to determine which lines appear among the forms with reasonable frequency. Lines which appear among the forms with reasonable frequency, but which don't show up more than once per page, and are part of Ground Truth 441, may make good candidates for anchors.

Figure 7:
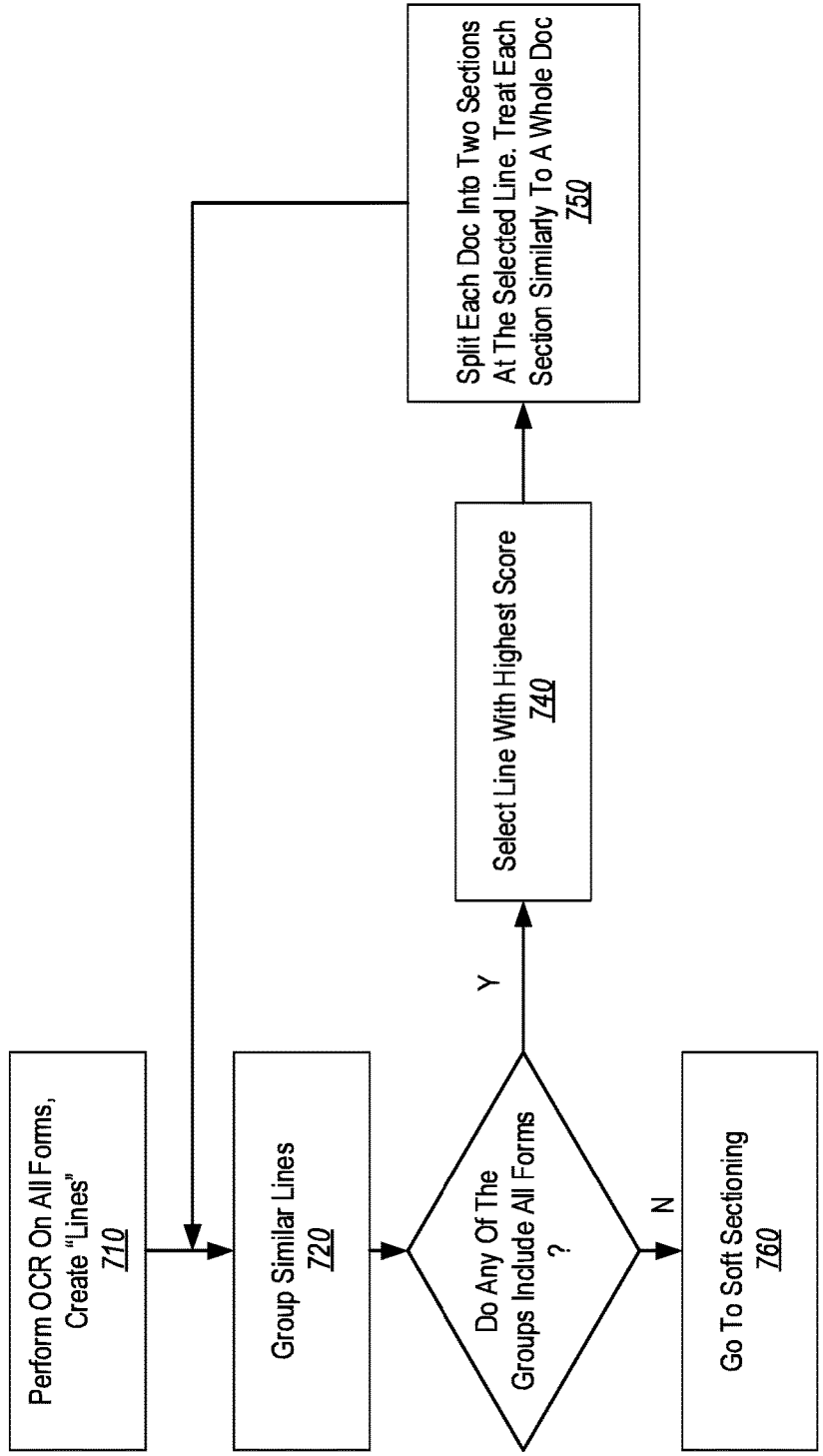
FIGS. 7-9 illustrate flow diagrams of examples for scoring and grouping content in forms.
Figure 8:
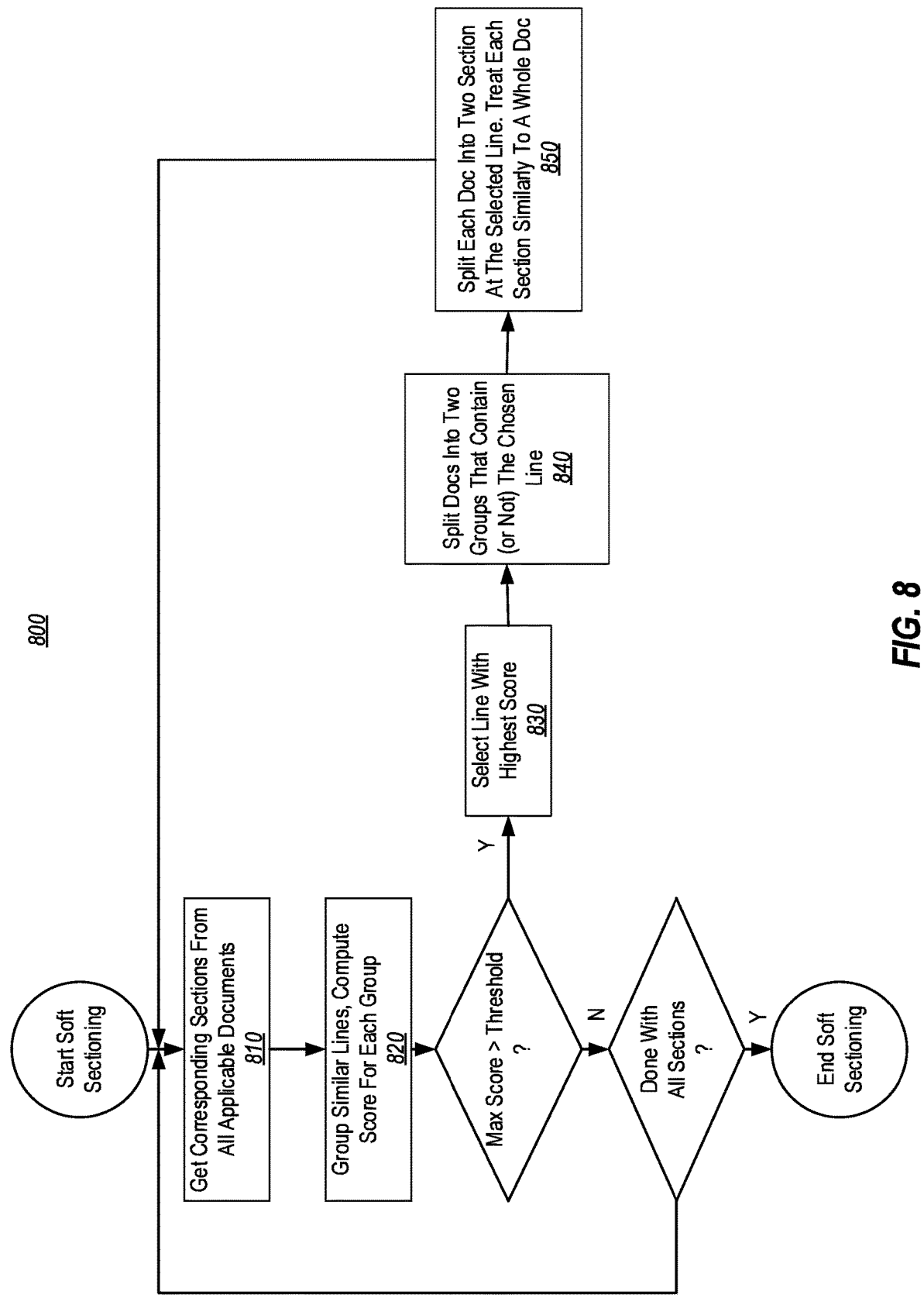

FIG. 7 illustrates a method 700 for sectioning portions of forms based on line groupings. For instance, the illustrated method is shown as including an act of performing OCR on the forms to create lines (710), as described above. Then, similar lines are grouped together (720). The similarity of the lines can be based on any attribute, including type, length, values, etc. Then, similar lines are grouped together. If any of the groups includes all of the forms (730), then a line with the highest score is picked (740), where the score is based on frequency of the particular line in the forms. That picked line in the forms is then used to split the documents into different sections (750), being split at the line. Then, each split section can be treated as a separate document that is saved as a document for further consideration/processing according to any of the disclosed processing methods described herein. Once it is determined that there are no more groups of lines that are present in each of the forms, the process moves to soft sectioning of the forms (760), such that each section can be saved/identified for further processing as a separate document/form section. Further scoring and sectioning (800) of the documents/forms can also be done, based on scoring performed for selected sections of forms in addition to and/or instead of for an entire form, as shown in FIG. 8, for example. As illustrated, the soft sectioning of the form may include identifying all sections from all applicable documents/forms (810). Then, the system will group similar lines for each grouping and score them based on frequency (820). If the score is above a predetermined threshold, the system may elect to perform further sectioning of the form. This further sectioning may include selecting a line with the highest score, such as based on a frequency of particular lines (830). Then, the document/form/section may be further split into groups/groupings based on whether a particular document/section has the particular chosen line (840). The document/section may then be split even further at the selected line, if present (850), into two different groups that are each separately identifiable and usable to perform the further processing described herein.

Figure 9:
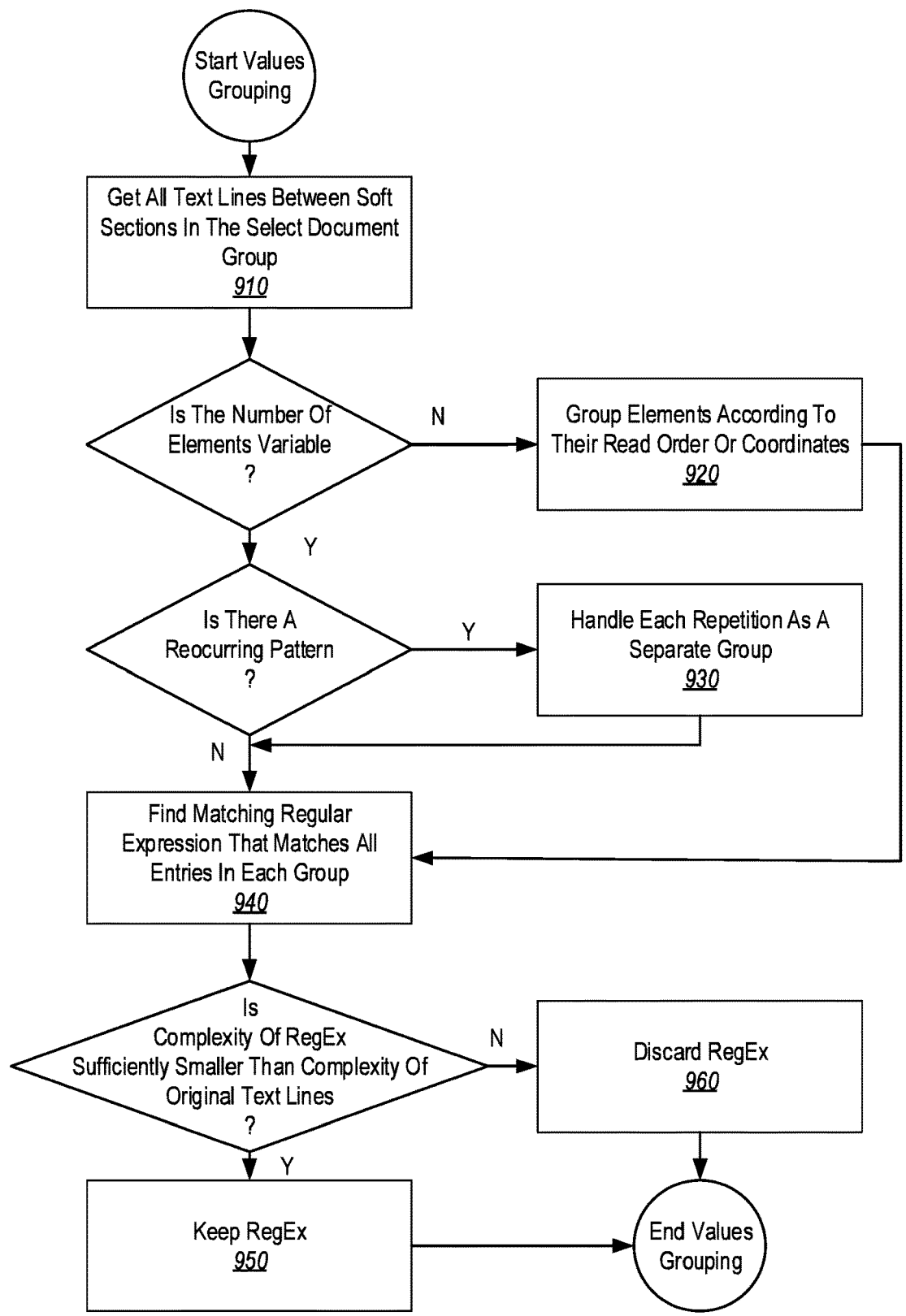

FIG. 9 illustrates a flow diagram (900) of a related process for identifying and grouping the content within a form (or section of a form) and for, in some instances, identifying regular expressions to use for the different groupings of elements in the form. As shown, the system first gets all text lines between the sections in a selected document group (910). Then, the system determines whether the content elements in the particular groups is variable, (e.g., are the group elements the same for the different groups). If they are not variable (e.g., the elements are all the same), the system groups the elements according to their ordering, such that the same elements are grouped together between the different groupings based on their ordering and/or coordinates in the form/group (920). If the elements are variable between the different groups of elements, a determination is made if there is a recurring pattern. If so, the pattern can be used to handle each repeating set of elements as a separate grouping of elements (930). Alternatively, the system looks for matching regular expressions that match all entries in each group (940). The system does this for each group of elements that are not determined to be variable, as well.

Then, if the complexity of the regular expression is less than the complexity of an original line of text, the new regular expression will be used for the corresponding grouping (950). Alternatively, the regular expression is disregarded and is not used for corresponding grouping (960).

Attention is now referenced based to FIG. 4, in which anchor generation block 455 may determine the anchors to use for forms. First, all values present in Ground Truth 441 are removed from the forms. Next, lines that occur more than once per page are removed. Next, a histogram of the remaining lines is completed. The lines are then scored based on frequency, with extra points given if a line is included in a set of "known good anchors," such as "date," "address," "DOB," "order number," "Customer," and/or the like. Next, based on this score, the top N anchors from all of the forms, are determined, where N is a number that is determined based on the histogram.

Determined anchors for the form generated by anchor generation block 455 may also be received by vocabulary learning block 457. Vocabulary learning block 457 may use the ground truth, the generated anchors, and outputs from Parser block 453 to generate a language model. The language model output from vocabulary learning block 457 may be used by OCR block 453 to provide more accurate OCR by acting as a model-tuned form of OCR. The adjustment may include adding or increasing in the language model for fields which are present in the anchors, for use on the whole form. Also, the OCR may be run with a field-specific language model and run on a specific bounding box where the field is expected to be. For example, a particular language model may be trained for dates, another for addresses, and another for names, and so on. Regular expressions may be run in the language mode. In some examples, this may be specified via a Finite State Transducer Model and incorporated into the OCR language model. Regular expressions rules may be extrapolated from the forms in this manner.

Feature generation block 456 may receive the modified forms and generate feature rules based on the type of form, and also generate features and labels from the form. In some examples, the terms "feature" here is used in the machine learning sense, where a feature is an individual measurable property of the form. Features are the inputs of the machine learning in these examples. The type of features used as inputs to the machine learning may be important to effective machine learning. For example, it would be possible to just literally input each pixel as features, but that may not result in machine learning as effective as would be the case by using higher level features.

In some examples, learned features may include, among other things, features that may be helpful in locating desired fields, including, but not limited to document edges, lines, boxes, symbols or other images, orientations, scaling, perspective views, fonts or styles, and other visually detectable attributes of the form and content within the form. These features and their values may be absolute values or relative values to other components within the form or relative to other forms.

In some examples, finding features that help locate desired fields may be accomplished as follows. First, a list of the Ground Truth values for a particular field for the form being trained is obtained. Next, it is determined whether the field has a limited vocabulary. For instance, if a field has less than 13 possible values, and each value shows up at least twice, this may be a good candidate for a "limited vocabulary field." In this case a feature of "is line in vocabulary" or "edit distance to make line match a vocabulary entry" may be included. For instance, in a particular field, the only valid values might be one of the twelve months of the year. Or, the only valid values might be one of the four months at the end of a quarter. Such values would likely make good candidates for limited vocabulary fields.

Next, it may be determined whether a particular word or line is in a fixed format. For instance, in some examples, feature generation block 456 converts all numbers to 9, and all letters to X, and all symbols to #. Next, in some examples, feature generation block 456 determines whether all (modified) values follow a few patterns—e.g., at most three patterns with at least 20 elements in each. If so, in some examples, feature generation block 456 uses a matching regular expression, and includes the matching regular expression as a feature. Additionally, feature generation block 456 may determine whether fields obey one or more additional patterns, such as every letter being a "W."

Next, feature generation block 456 may use features such as number of letters, number of digits, number of special characters, and/or the like. Features may include how many letters does the field have, does it have dots, commas, or parentheses, and/or the like. Other examples of features may include the location of anchor text, and/or the like. Features may include the determined lines and text of the lines, a determination as to whether the line is a value, key, and/or anchor, location of the text, and properties of the text itself that may be relevant such as text size, font, and/or the like.

So, an example feature rule could be: "does this line or word conform to a format of five characters, including two digits, followed by a letter, followed by two digits?", yes or no. In some instances, the user provides or selects rules to use for the particular set of one or more feature analysis to use with the interfaces provided herein and/or with other interfaces.

The determined features and feature rules are not themselves, in these examples, requirements for the fields. Rather, in these examples, the machine learning training module block 458 will later determine how important a particular feature is or is not.

Feature generation block 456 also determines labels for the lines in the form. For each line in the form, it is determined whether the line is a value, based on the ground truth and other factors discussed above. If the line is not a value, then the line is not assigned a label. If the line is a value, a determination is made as to the key corresponding to the value, based on the ground truth. If a key corresponding to the value is not found, a label is not assigned to the line. If a key corresponding to the value in the line is found, then the line is assigned the corresponding value as a label.

If multiple fields each have the same value that corresponds to a value that is present in the ground truth, this can be handled in different ways in different examples. In some examples, both labels are left unassigned. In some examples, both lines are assigned the same key. In some examples, the line is assigned the closest key.

Machine Learning Training Module block 458 may generate a key-value pair determination model 444 based upon the received features and labels. In some examples, Machine Learning Training Module block 458 may generate a key-value pair determination model 444 by directly using the vectors of features and labels to train a classifier, such as, for example, a random forest classifier, a decision tree, a neural network, a support vector machine, and/or another suitable classifier.

In some examples, Machine Learning Training Module block 458 may generate a key-value pair determination model 444 as follows. The most common words are selected as keywords, and the keyword coverage is verified and/or modified during the training. In some examples, forms that contain the "value" based on Ground Truth 441 are identified, and "value" and "keywords" from these matches as training. Then, features and machine learning may be selected as appropriate for identifying the particular key-value pair as indicated in Ground Truth 441.

Block 458 may determine, for example, that "zip code" is always a key. If, however, a line is encountered for which it is not known whether the line is a key or a value, factors such as font and size of the text may be used. If previous known keys have used a particular font size and type and begin at the same horizontal position, whereas previous known values have not, and a line has the same font size, font type, and begin at the same horizontal position as the previous known keys, then block 457 may determine that the line is likely a key, and if this is verified by the Ground Truth, this may be used as part of the model.

As an example, the machine learning may determine that the value for a particular key may typically be found to the upper left of that key in the form. However, it may determine that, for a particular type of form, based on particular features being present, it is instead that there is a likely a horizontal line above the key and that the value for the key is typically above that line in this type of form.

Figure 5:
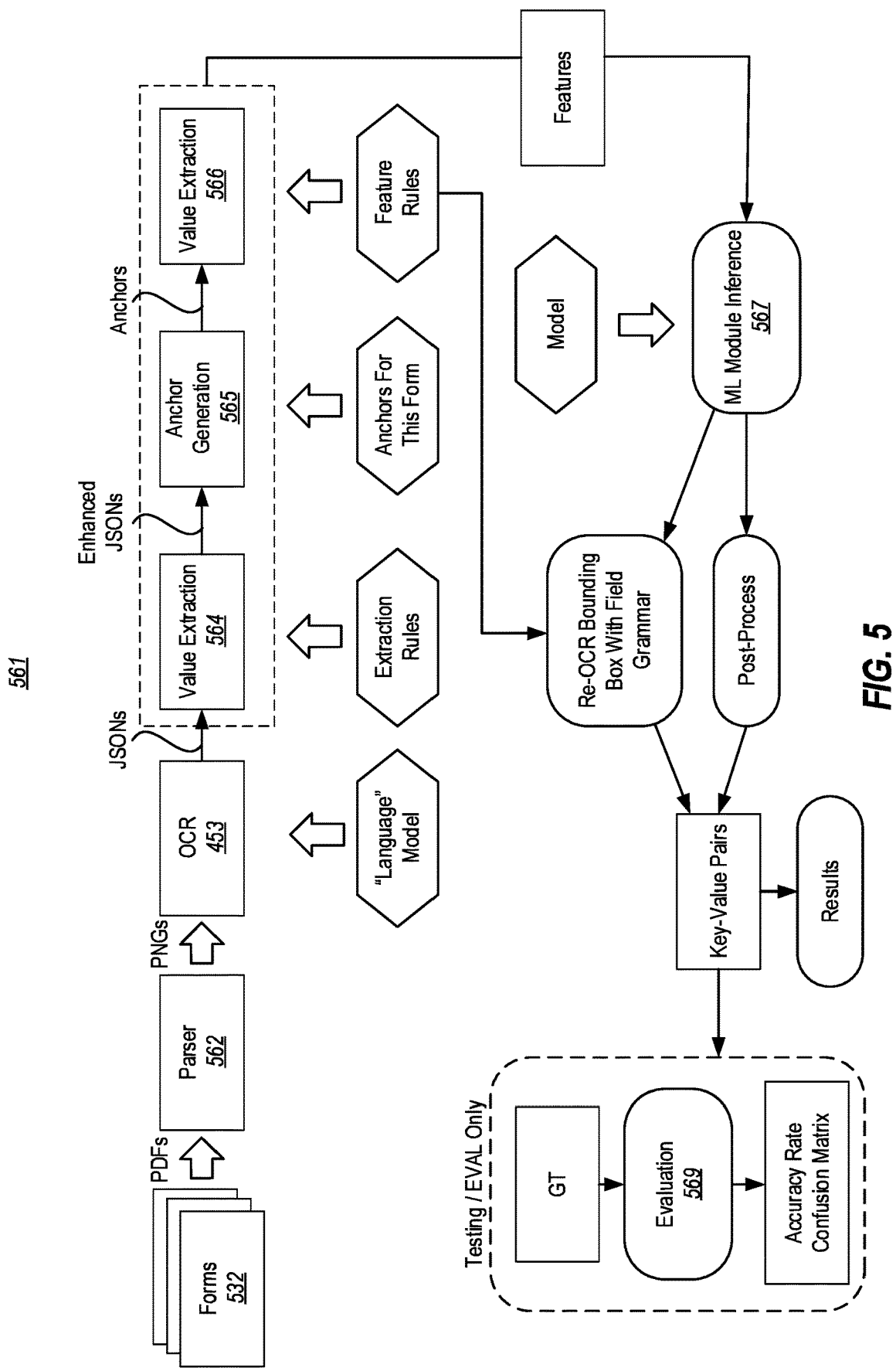
FIG. 5 is a functional block diagram illustrating an example testing/service pipeline.

FIG. 5 is a functional block diagram illustrating an example testing/service pipeline (561), which may be employed as an example of testing/service pipeline 361 of FIG. 3. Testing/Service pipeline 561 may include Parse block 562, OCR block 563, value extraction block 564, anchor finding block 565, feature generation block 566, machine-learning module inference block 567, and post-processing block 568. For testing and/or evaluation purpose, evaluation block 569 may also be included in testing pipeline 561.

Testing/Service pipeline 561 may be used to OCR forms 532 and generate key-value pairs for the forms, based on the language model, extraction rules, extracted form anchors, and key-value pairing model obtained by training pipeline 551. In the service pipeline examples, this is done during regular operation on forms for which the key-value pairs are not known, but which are predicted by service pipeline 561. In the testing pipeline examples, there is a ground truth for the forms, which may be used by evaluation block 569 to evaluate the accuracy of the results.

Parsing block 562 may be configured to receive forms 532 and to parse forms 532. Forms 532 may be portable documents in a format such as PDF format, and/or the like. The output of parsing block 562 may be in a raster graphics file format, such as PNG, or in another suitable format. OCR block 563 may be configured to perform optical character recognition on the output of parsing block 562. OCR block 563 may perform OCR based, in part, upon the input Language Model. OCR block 563 may output the forms as documents that include a text format, such as JSON or another suitable format.

Value extraction block 564 may receive the output of OCR block 563, and modify the documents to include line breaks based on the input Extraction Rules. Anchor finding block 565 may receive the document with lines breaks added from value extraction block 564, and may determine anchors based on the input extracted anchors. Feature generation block 566 may receive the modified forms, and may generate features from the forms. Machine Learning Module Interface block 567 may receive the features generated by feature generation block 566, and, based on those features and the key-value pairing model, generate preliminary key-value pairs. For example, through the key-value pairing model, block 567 may be able to make the determinations of preliminary key-value pairs based on position of text, position of text relative to other text, formats, such as particular fields expected to have certain numbers of particular types of characters, the presence of special characters, and/or the like.

After block 567 generates the preliminary key-value pairs, one or more bounding boxes may be re-OCRed by OCR block 563, and then run through blocks 564-567 again for increased accuracy. Next, in some examples, post-processing block 568 performs post processing to generate the key-value pairs. For instance, a particular key may have a possible value of "yes" or "no" which is indicated on the form by a checkbox which is left either checked or unchecked. In this case, the words "yes" or "no" as values for the key are not present as text in the form. However, during post processing, for example, the x in a particular location may be used to determine during post-processing by post-processing block 568 that the value of a corresponding key is "yes." The key-value pairs output by post-processing block 568, along with the OCRed form, may serve as the results of service pipeline 561. In testing pipeline examples as discussed above, the key-values may be received by evaluation block 569 for an accuracy determination.

Illustrative Processes and Interfaces

For clarity, the processes described herein are described in terms of operations performed in particular sequences by particular devices or components of a system. However, it is noted that other processes are not limited to the stated sequences, devices, or components. For example, certain acts may be performed in different sequences, in parallel, omitted, or may be supplemented by additional acts or features, whether or not such sequences, parallelisms, acts, or features are described herein. Likewise, any of the technology described in this disclosure may be incorporated into the described processes or other processes, whether or not that technology is specifically described in conjunction with a process. The disclosed processes may also be performed on or by other devices, components, or systems, whether or not such devices, components, or systems are described herein. These processes may also be embodied in a variety of ways. For example, they may be embodied on an article of manufacture, e.g., as processor-readable instructions stored in a processor-readable storage medium or be performed as a computer-implemented process. As an alternate example, these processes may be encoded as processor-executable instructions and transmitted via a communications medium.

Figure 6:
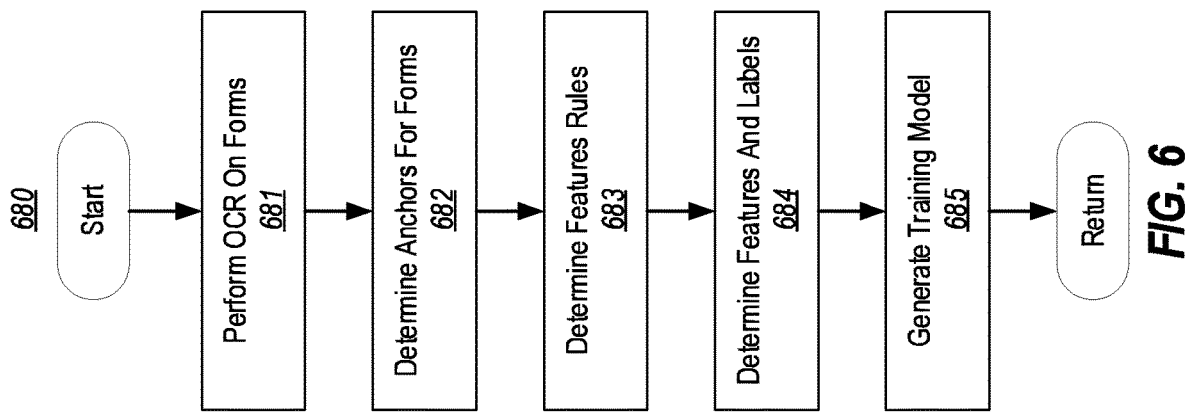
FIG. 6 is a flow diagram illustrating an example of a training process, in accordance with aspects of the present disclosure.

FIG. 6 illustrates an example dataflow for a process (680) for training. In some examples, process 680 is performed by a device, such as device 200 of FIG. 2, or system 300 of FIG. 3.

In the illustrated example, step 681 occurs first. At step 681, in some examples, optical character recognition is performed on a plurality of forms. In some examples, the forms of the plurality of forms include at least one type of form. As shown, step 682 occurs next in some examples. At step 682, in some examples, anchors are determined for the forms, including corresponding anchors for each type of form of the plurality of forms. As shown, step 683 occurs next in some examples. At step 683, in some examples, based on the plurality of rules and the ground truth, feature rules are determined, including corresponding feature rules for each type of form of the plurality of forms.

As shown, step 684 occurs next in some examples. At step 684, in some examples, features and labels are determined for each form of the plurality of forms, this may include performing the processed described earlier, with regard to FIGS. 7-9, identifying different elements and expressions for those elements in the forms/form sections and element groupings. As shown, step 685 occurs next in some examples. At step 685, in some examples, a training model is generated based on a ground truth that includes a plurality of key-value pairs corresponding to the plurality of forms, and further based on the determined features and labels for the plurality of forms. The process may then proceed to the return block, where other processing is resumed.

Figure 34:
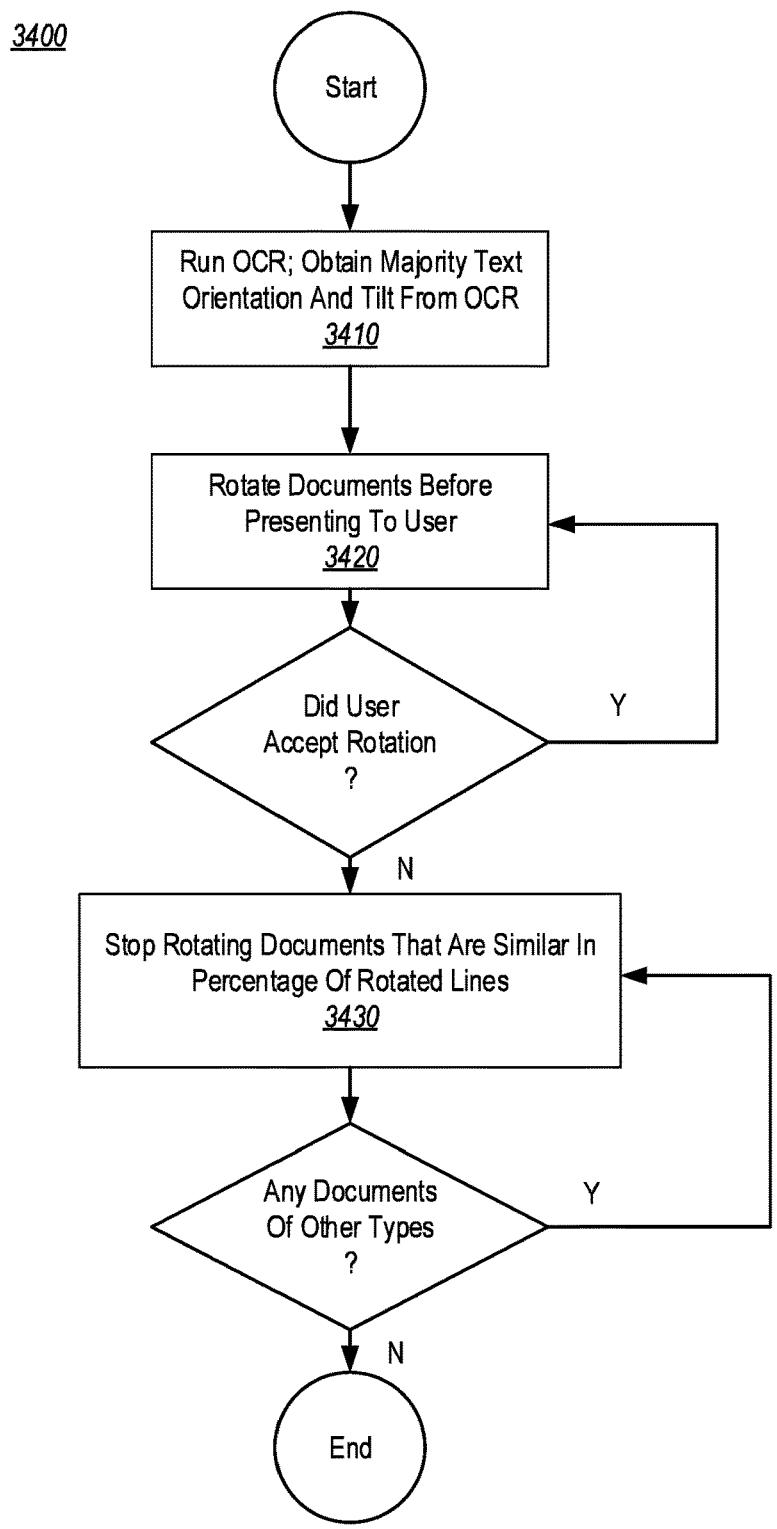
FIG. 34 illustrates an example flow diagram of a process for rotating a form to address alignment issues when presenting the form.

Attention will now be directed to FIGS. 10-35. In these Figures, FIGS. 10, 12-14, 16-33 and 35 illustrate various non-limiting examples of interfaces that can be used for processing forms, for identify ground truth for training models that can be used to analyze forms, for training the models, and for applying the models to forms to identify content in the forms, while FIGS. 11, 15 and 34 illustrate flow diagrams of example process for prioritizing forms to use in training (FIG. 11), for providing suggestions for autocompleting key name data to use for ground truth (FIG. 15); and for rotating form to address alignment issues when presenting the form (FIG. 34).

As suggested above, the system identifies, either automatically and/or with user input, a set of forms to use for identifying ground truth of key-value pairs. The set of forms may be a limited set (e.g., 5, 10, 15, 20, 25 or more) of all forms that the system currently has access to. In some instances, the forms have first been clustered according to form attributes/features and the system intelligently picks and sorts a set of the forms for subsequent processing, which is a predetermined number of form (e.g., 10) or a percentage of available forms (e.g., 1.0%).

In some instances, the set of forms to be used is manually selected by the user.

Once the forms are identified (manually/automatically), the system uploads them for OCR processing and presents the set to the user on a user interface to show the OCR processing/state of the forms and to facilitate the identification of the keys and labeling of the ground truth key-value pairs.

Figure 10:
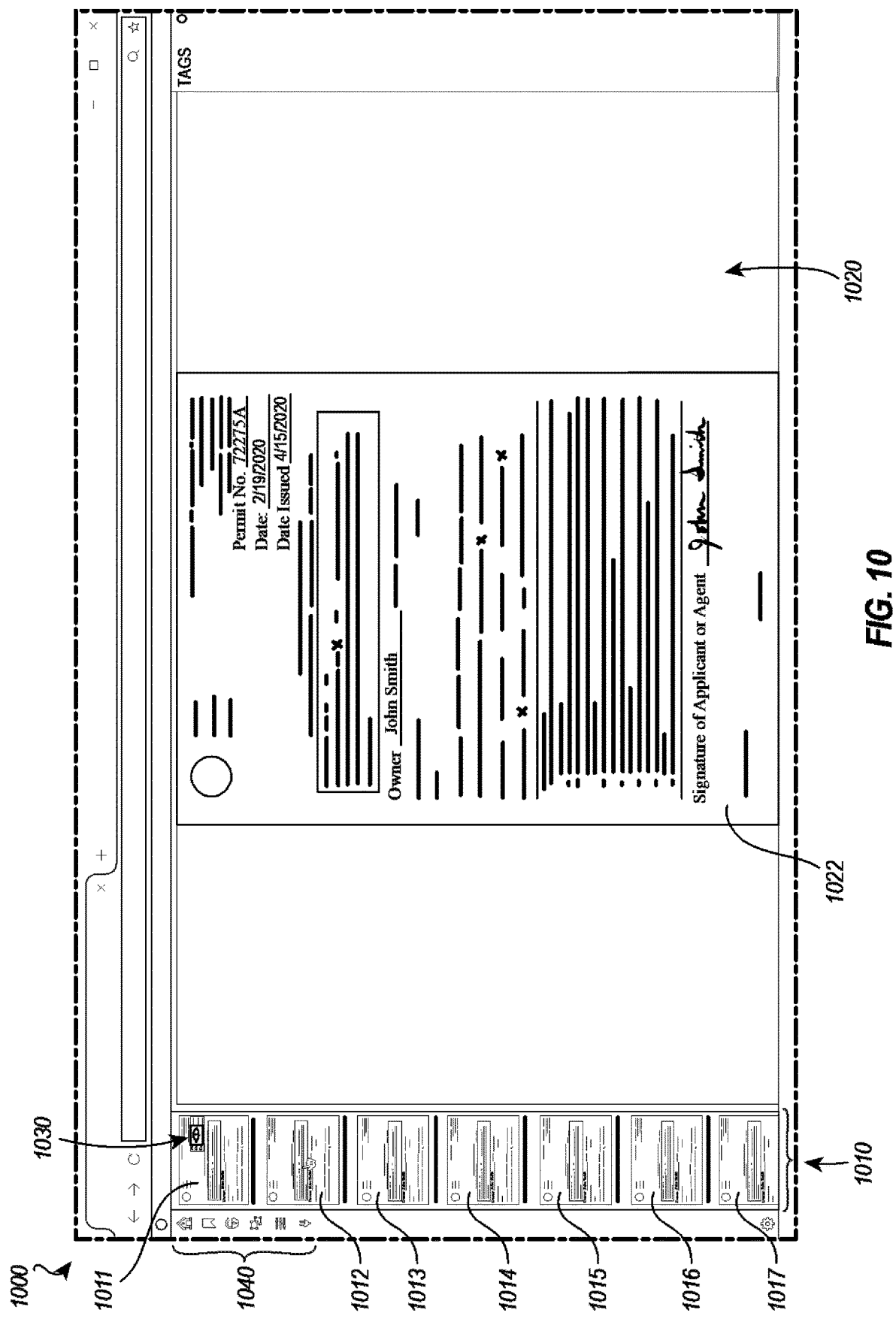
FIG. 10 illustrates a non-limiting example of an interface that can be used for processing forms, for identify ground truth for training models that can be used to analyze forms for identifying content in the forms.
Figure 11:
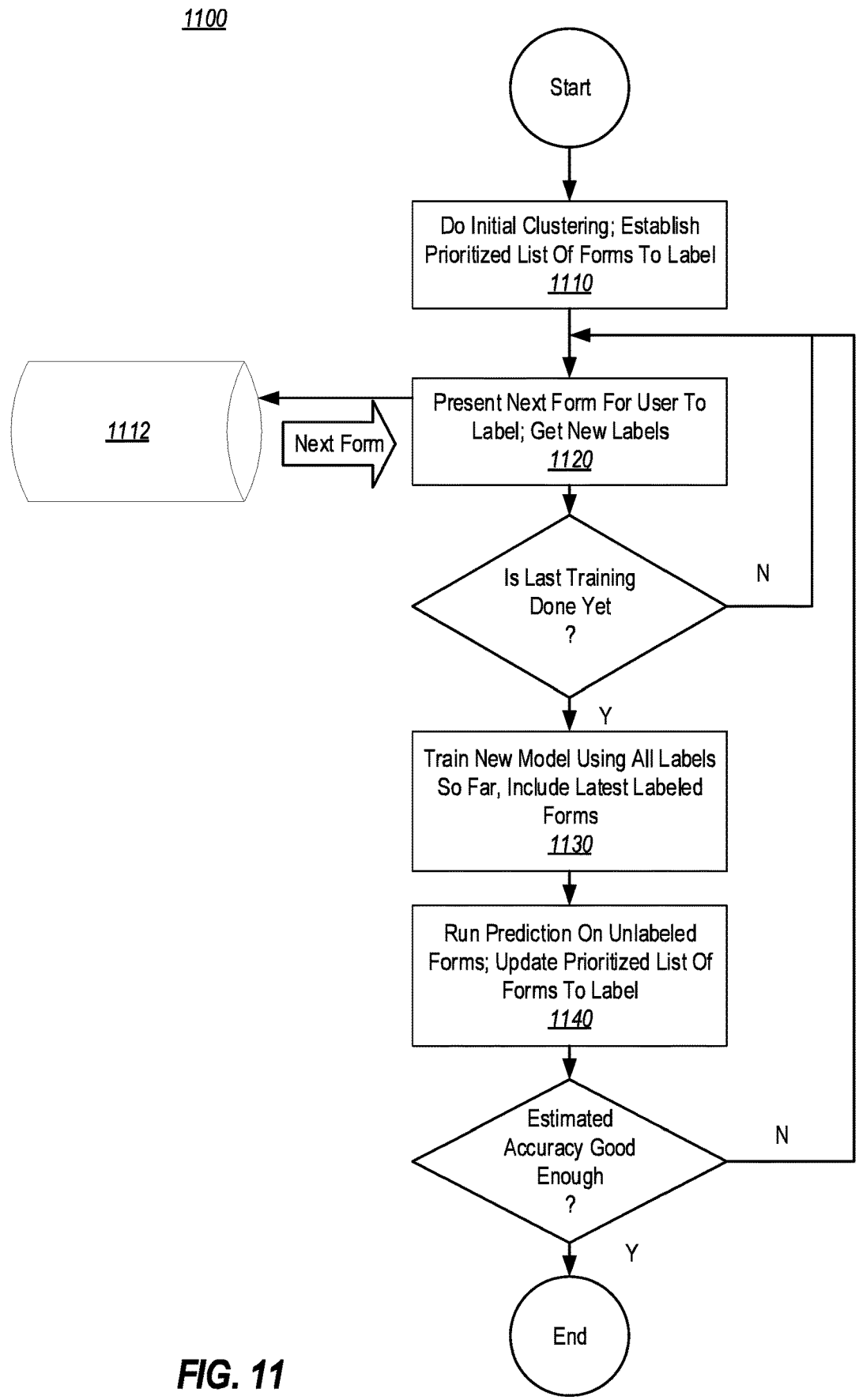
FIG. 11 illustrates an example flow diagram of a process for prioritizing forms to use in training.

For instance, as shown in FIG. 10, an interface 1000 is provided that identifies a plurality of selected forms (showing only the first page of each form (1011, 1012, 1013, 1014, 1015, 1016, 1017)) in a thumbnail frame view (1010), along with a single form view frame view (1020) that shows a particular one of the forms 1022 from the set of selected forms.

The thumbnails may be presented with a graphical status indicator (1030) (such as a symbol in the top right corner of the document) that reflects whether the corresponding form has undergone or is currently undergoing OCR processing, whether the form has been labeled with selected keys, whether more processing is needed by the user for labeling, whether the form is presently shown in the single view frame, or any other state data. Different colors, shapes, sizes, animations, and/or types graphical symbol can be used to convey this state information.

A control panel (1040), shown to the left of the thumbnails may be used to provide selectable controls that are selectable to (when selected) initiate selection of new or additional forms to use for labeling/training, to initiate training of labeled forms, to initiate OCR or other processing of the forms.

As shown in FIG. 11, a process (1100) may be used for prioritizing the forms shown to the user to select user-assisted labeling and for training models to use for labeling other forms. Initially, the system clusters groups of forms/documents/or form sections (1110). The clustering may be performed, as described throughout to identify similar groups of forms or form sections to use for selecting training data. The clustered groupings may be prioritized to identify the groups/groupings of forms or form data that have the highest scores (e.g., frequency of similar elements) to be used for training data. This set of clustered groupings may be stored in storage 1112 of the system performing the clustering and training or a remote system. the prioritization can be used to select and/or order the forms presented (1120) in the interface for the user to use in the selection of key pairs for training data. The set of presented forms, therefore, can be dynamically modified when the accuracy reflects the need for new forms to be selected for labeling/training, such as in response to a first document/form being processed and a new form being presented to the user.

The process of selecting the forms for presentation to the user (1120) will continue until all forms identified during clustering for training a type/set of forms are completed.

After the forms have been labeled (e.g., processed to select the key pairs) used for training a model, the model is trained with the corresponding sets of labels or key pairs (1130). Then, to ensure adequate training data has been obtained, the system runs a prediction on unlabeled forms to identify new forms to select for obtaining training data from (1140). This prediction may determine, for example, whether a certain percentage of forms have been processed/labeled and/or whether the data obtained can generate an accurate prediction of labels for unlabeled documents based on the trained model (trained on the processed/labeled forms). When selecting new forms with an updated prioritization list of forms to label, the system may select/prioritize the selection of forms having the greatest variability from the forms that have already been labeled.

Figure 12:
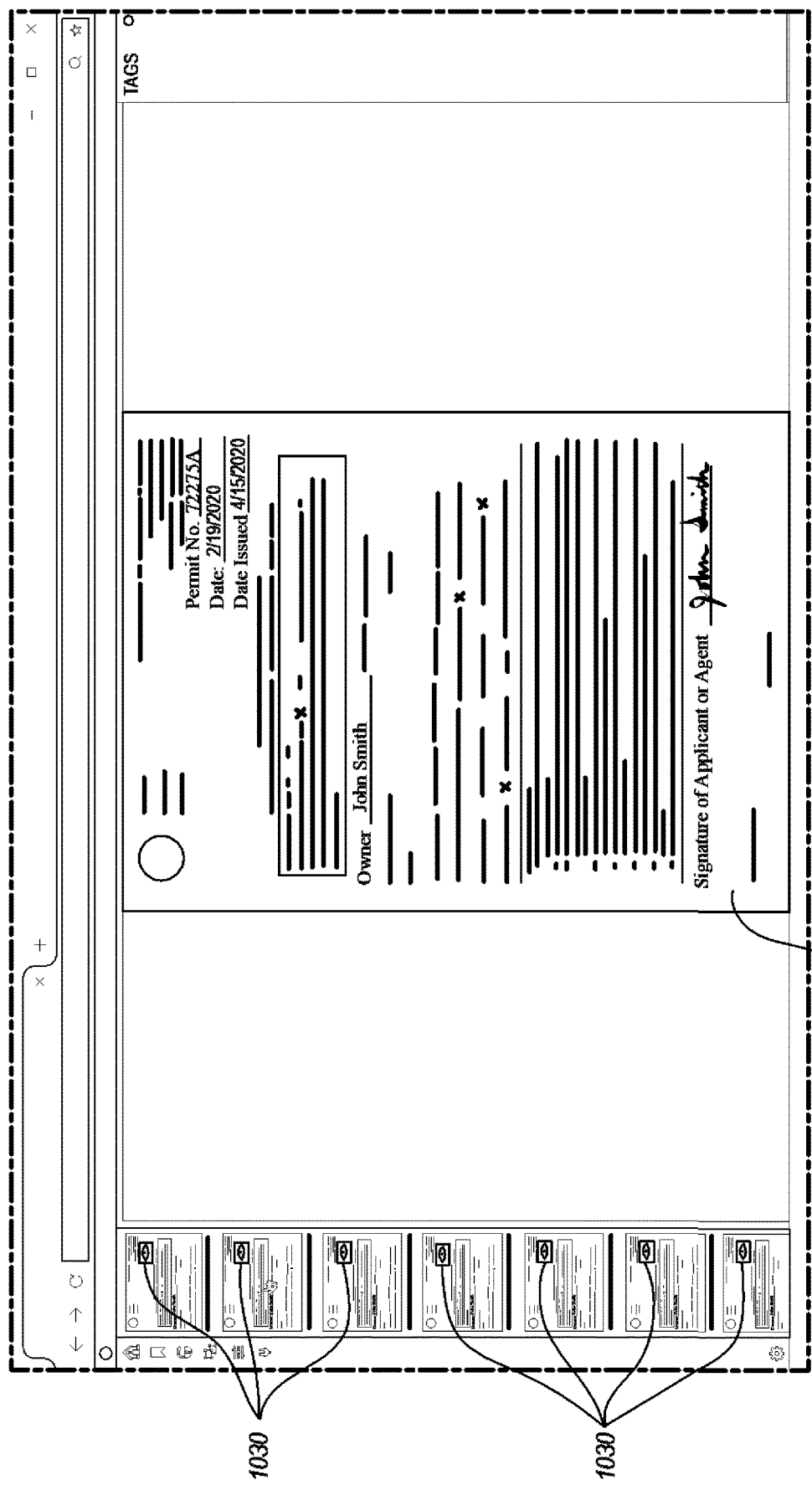
FIGS. 12-14 illustrate various non-limiting examples of interfaces that can be used for processing forms, for identify ground truth for training models that can be used to analyze forms for identifying content within the forms.

FIG. 12 illustrates a view of the interface in which all of the selected forms shown in the thumbnail view 1010 have completed OCR processing, as reflected by the thumbnail status indicator. Additionally, a selected form from that set is presented for view in the single view frame in which the content is highlighted (which can be highlighted by a particular color (e.g., yellow or other color), or with font highlighting (e.g., bold, italic, other) or shading/texturing) to reflect that the highlighted text has successfully undergone OCR processing.

Figure 13:
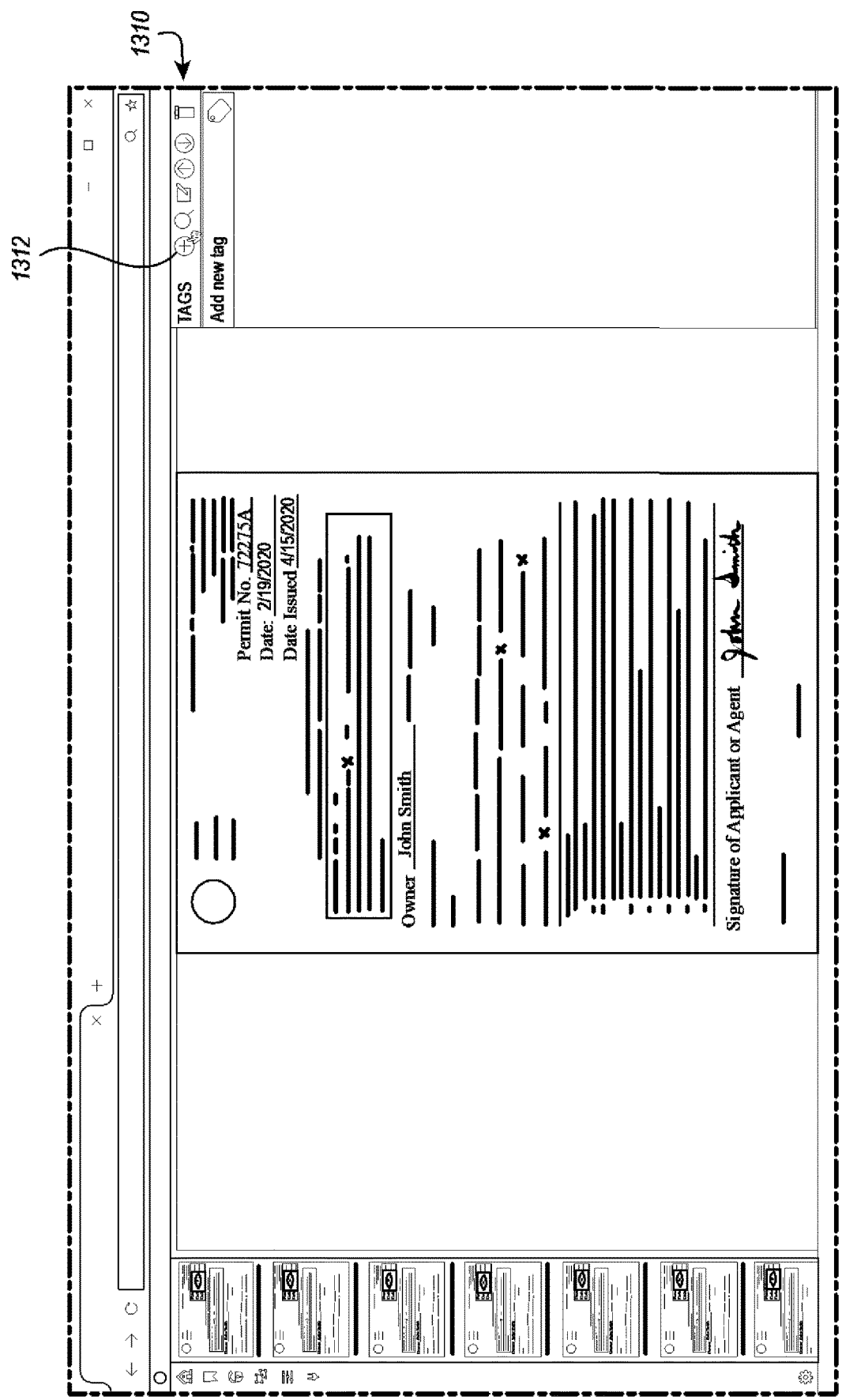

Next, FIG. 13 reflects a user selecting a control 1312 in a key control panel (1310), to initiate the creation of a key for which a user will label the corresponding value from the form.

Figure 14:
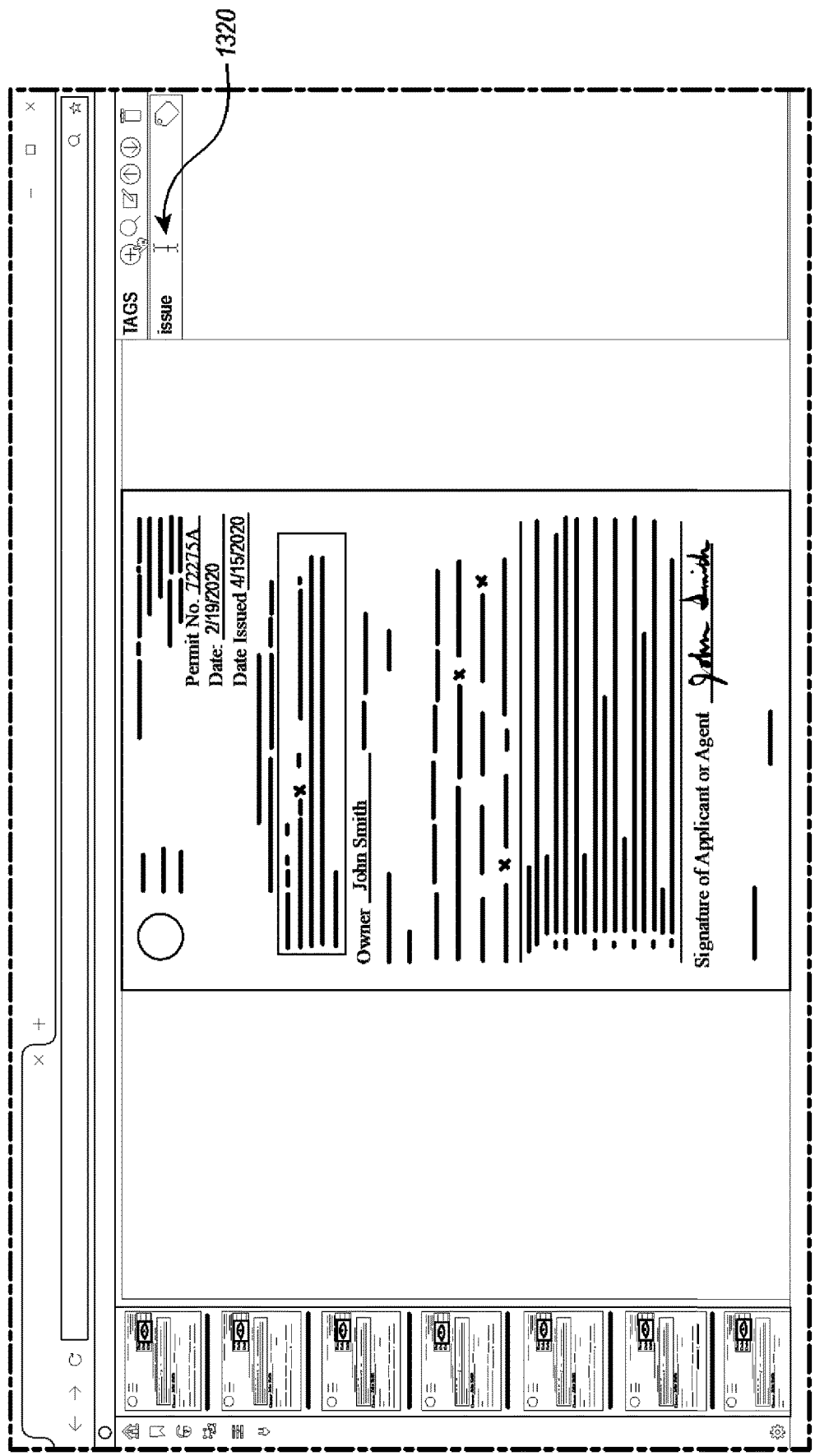
Figure 15:
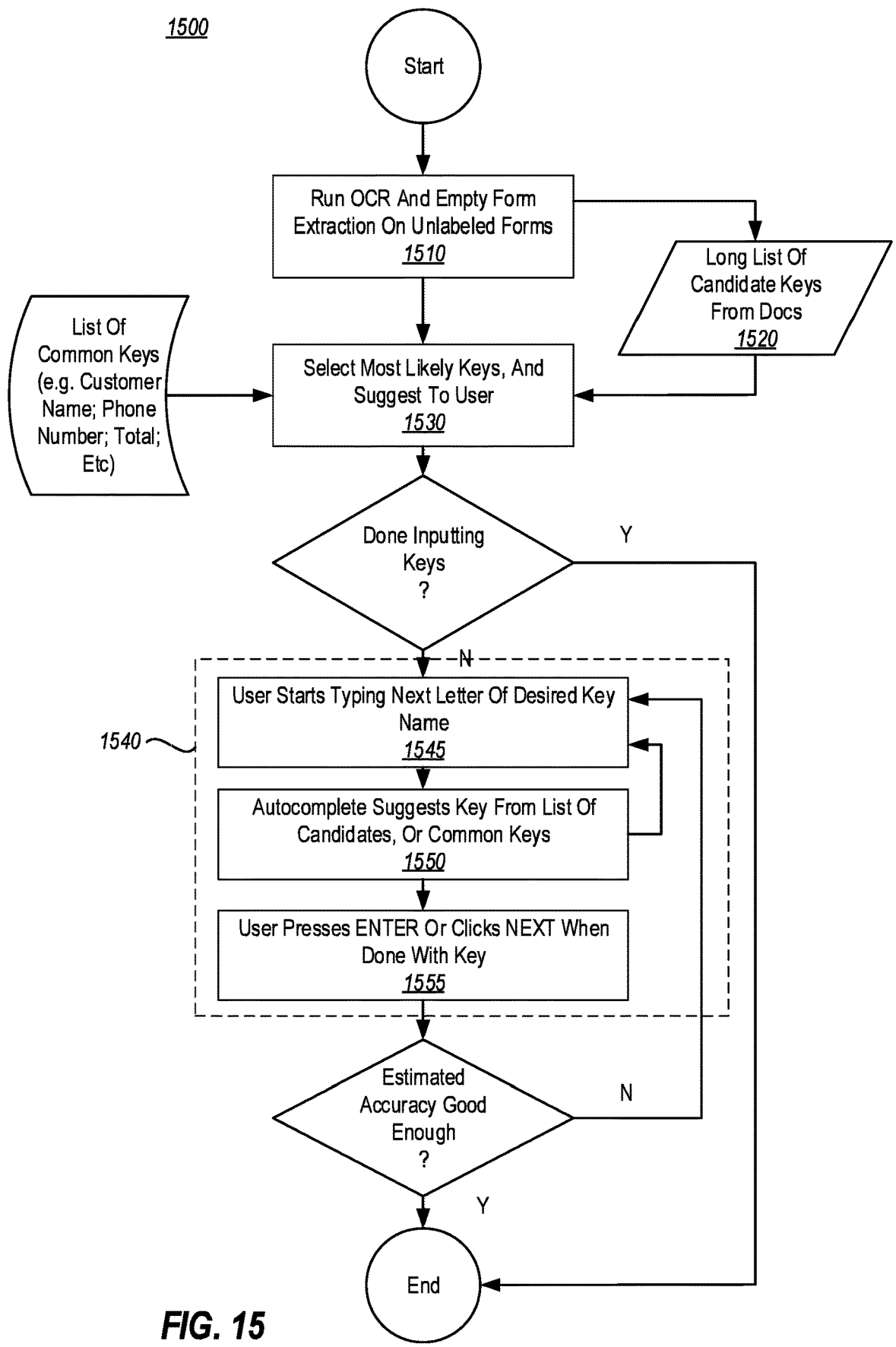
FIG. 15 illustrates an example flow diagram of a process for providing suggestions for autocompleting key name data to use for ground truth.

FIG. 14 shows the key field 1320 being presented for a user to enter the name of the key (also referred to as tag or a label, in some instances). The systems may auto-suggest/complete the key field based on recognizing characters that the user types in the field and that match the index of terms identified in the form or set of selected forms and/or corresponding cluster or that correspond to a directory of possible key/tag names. This is different, notably, than a general dictionary look-up. It is limited to terms identified in the form(s) used for the training.

FIG. 15 illustrates a flow diagram 1500 of an example process for performing the auto-complete functionality on the key name entry during labeling of the key names in the selected forms. As shown, the process begins with the system running an OCR process on unlabeled/selected forms to be labelled (1510). This OCR process identifies the different line/content/elements in the forms that is used for grouping/scoring the form data, as previously described.

The system may also receive a list of keys from third parties and/or that are extracted/identified from the forms that have undergone OCR processing (1520, 1525). Thereafter, the system selects the keys (1530) that are most likely to be utilized/desired by the user to select/label within the particular selected forms for use in labeling and developing the training data.

In some instances, the system can also identify/select the keys for presentation to a user (after initial training) to correct/update the key/value pairings of a form being processed with the use of a trained model, such as when the system/model cannot resolve correlation between a particular key and corresponding value in a form being processed with a certain threshold of certainty with the trained model.

After the keys are identified for use in labeling a form, to identify the key/value pair to use for training a model, the system receives user input to select a desired key from the list (1540). This may include, for example, the user starting to type the name of a key (1545) and the system autocompleting the key in a key entry field (1550). The system may also receive additional input (e.g., a user provides enter/select input) (1555) and/or alternative input for entering/selecting a key and/or for completing the selection process of a particular key during autocomplete input and selection.

Alternatively, the user can type the entire name of the key completely without any autocomplete feedback/selection being made from the list of keys. Alternatively, or additionally, the user can select a key from a pull-down list that is presented in response to a user selection of a key listing control and/or in response to a user starting to type a key name in a key name entry field. Other means for a user to select a key from the key list can also be use.

Figure 16:
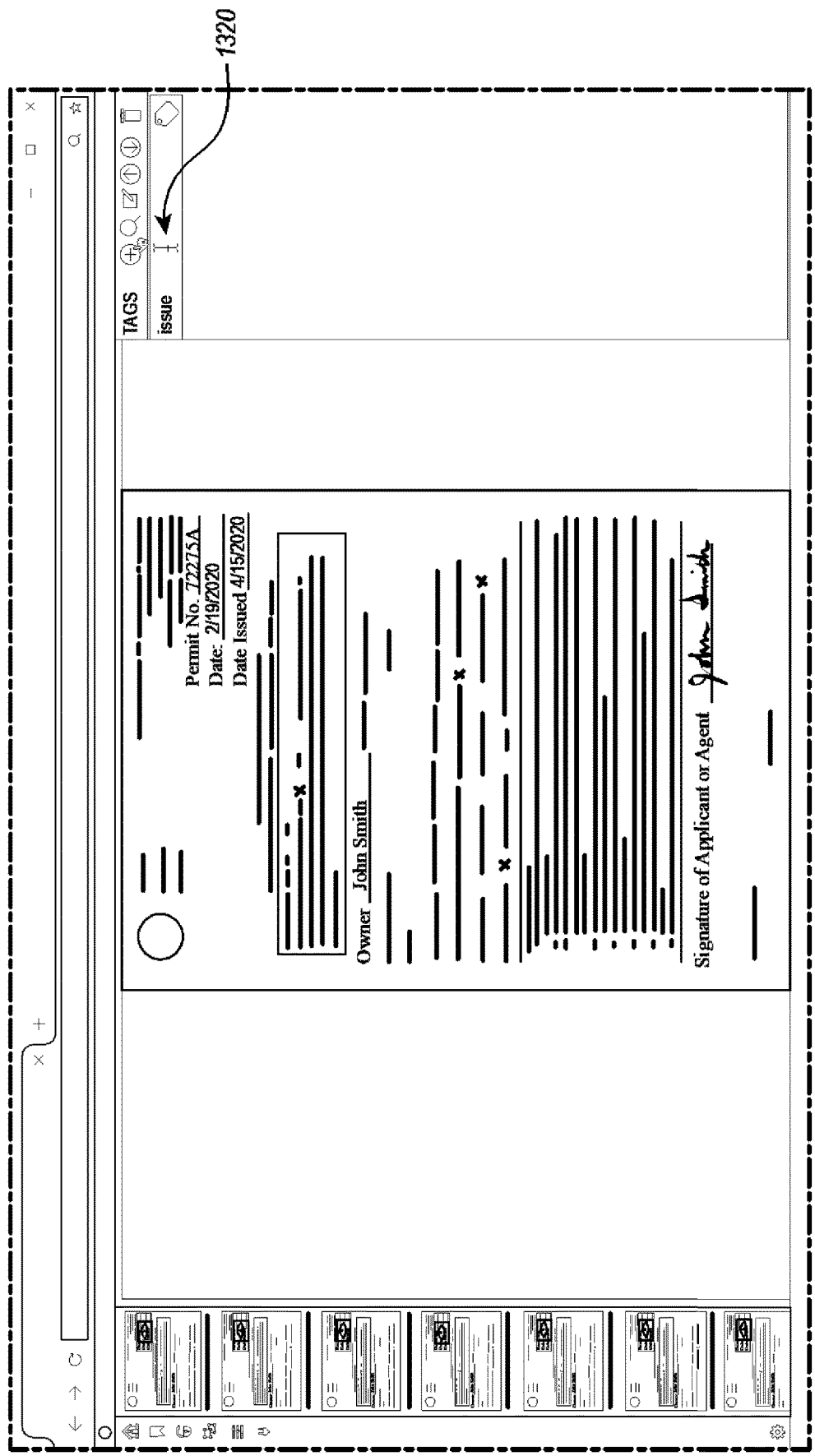

A non-limiting example will now be provided for the autocomplete process described in FIG. 15 for selecting or otherwise identifying the keys to use for labeling the form data with the key/value pairs to use for ground truth training data of a machine learning model. In this example, once the user has typed and/or accepted the auto-complete key name (e.g., issued date), it is associated with a labeling shortcut that can thereafter be used to initiate labeling of a key/value pair. For example, in this instance, the shortcut is the number 1. Thereafter, when the user presses the number 1, it will initiate/activate the linking between that key (e.g., issue date) and the value selected by a user from the form. This is shown in FIG. 16, as the user starts to type the term 'issue date.' Once the user types 'issue', into the key entry field 1320, the system identifies a match between a key 'issue date', from the key listing provided to the system (which shows the entire key for selection/entry by the user). Then, when the user selects this key or hits enter to the autocomplete presentation, the key is identified as a key to use for labeling. Then, once identified, it is associated with a shortcut link (e.g., the number 1, shown by reference number 1710 in FIG. 17), which can thereafter be typed/entered, rather than requiring the user to type the whole key or move the mouse to select the key form the key control panel 1720, to initiate the labeling of content from the form to be linked to that key to identify the key-attribute pairing used for ground truth.

Figure 17:
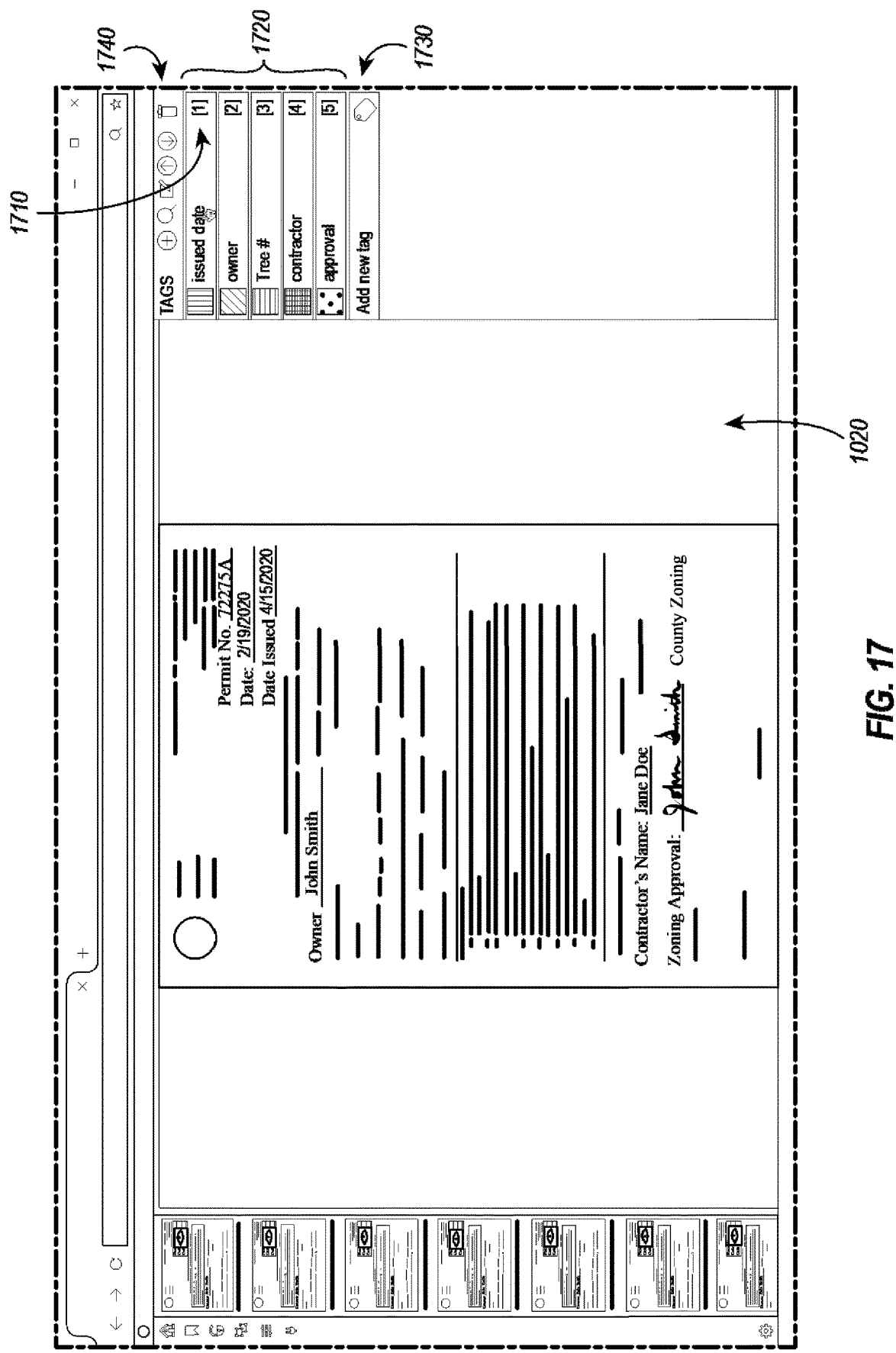

It will be appreciated that the user can identify/select numerous different keys to use for labeling ground truth from the forms, such as shown in FIG. 17, where several keys have been entered, selected or otherwise specified for use in labeling the forms. even more particularly, five (5) different keys have been specified or created. These include issued date, which is associated with shortcut 1; owner, associated with shortcut 2; tree #, associated with shortcut 3; contractor, associated with shortcut 4; approval, associated with shortcut key 5.

While numbers are currently provided as the shortcuts for a user to use as shortcuts for the different keys during labeling, it will be appreciated that other shortcuts can also be used, including, but not limited to, letters, control keys, icons and other elements (e.g., gestures and verbal cues).

In some instances, the user can specify the shortcut that is associated with a particular key. In other instances, the system automatically determines a shortcut key to associate with a particular key, such as based on a sequential ordering, based on a first letter of a key and/or any other factor. The user can specify and/or edit the shortcut for a particular key from the key control panel 1720 (currently presented in the top right corner above the keys being created) and/or by right clicking on a key or shortcut and/or through another menu interface, for example.

Once the keys to be used for labeling are identified, the user can select a particular one of the keys (e.g., by clicking on a key displayed in the key control panel 1720 and/or by entering or providing the shortcut for the key). This will trigger or otherwise cause the system, in some instances, to identify content within the form shown in the form view frame 1020 that matches the attributes of the selected key as an autosuggestion for a key-value pairing for ground truth. In other instances, the user will select the content from the form directly, which is to be associated with the activated (e.g., selected key).

In some instances, the attributes that are associated with the keys are predetermined by the entity that provided the list of keys to the system for user selection in labeling the ground truth (see elements 1520 and 1525 of FIG. 15, for example).

In some alternative or additional embodiments, the user can define the same or different attributes that are to be associated with particular keys, which the system will look for within the content of the form. The defining of attributes can occur during or after key creation/naming, beyond associating a shortcut with the key. For example, the attributes to associate with a key may include, such things as, but not limited to, an expected text format, string length, character type, font/style (e.g., typed or handwritten), language, and so forth.

In some instances, the user may specify or define key attributes by selecting a key/tag attribute control from the key control menu 1740 and/or by right clicking on the listed tag/key in the key control panel 1720. By way of example, if a phone number tag were presented in the specified tags of the key control panel 1720, a user could right click on the phone number key to cause the system to present a tag attribute form that a user could use to specify that the phone number key is associated with a character type attribute and length attribute, having a numerical character type and a length of between seven and thirteen characters, depending on the types of phone numbers that are expected (or any other absolute length or range of lengths). Other types of specifications/rules can also be specified for the keys through such a tag attribute form, including clarifications that a key value will be in handwriting or a different font style than the rest of the form values, or alternatively, be typed text, and so forth. These attributes/clarifications/rules can be stored in metadata with the form and/or in a separate key-value or key-attribute pairing used for ground truth by the machine models that are used by the disclosed embodiments.

Thereafter, once a key in the key frame panel 1720 is selected, the system can look for content/values within the corresponding form that is being processed (based on the aforementioned parsing/OCR processing of the form) to identify the content/values identified during the parsing/ OCR processing that match the associated attribute(s) for the selected key. Then, matching content/value(s) for the selected key (if found) can be highlighted within the form as suggestions for creating a key-value pairing. The highlighted content that matches the defined key attribute(s) will be displayed to the user within the form and can also be presented in the key control panel 1720 next to the selected key.

Figure 18:
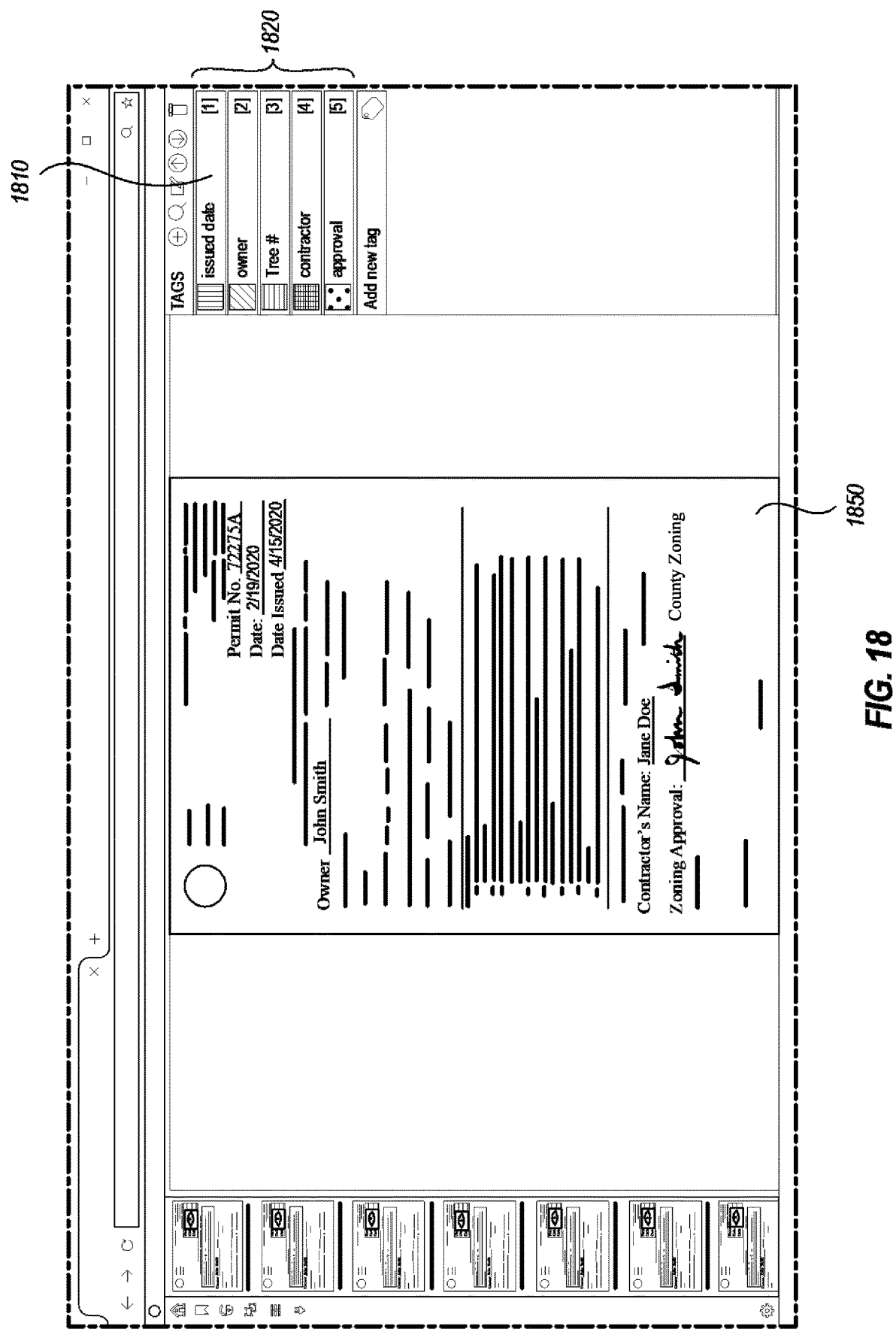
Figure 19:
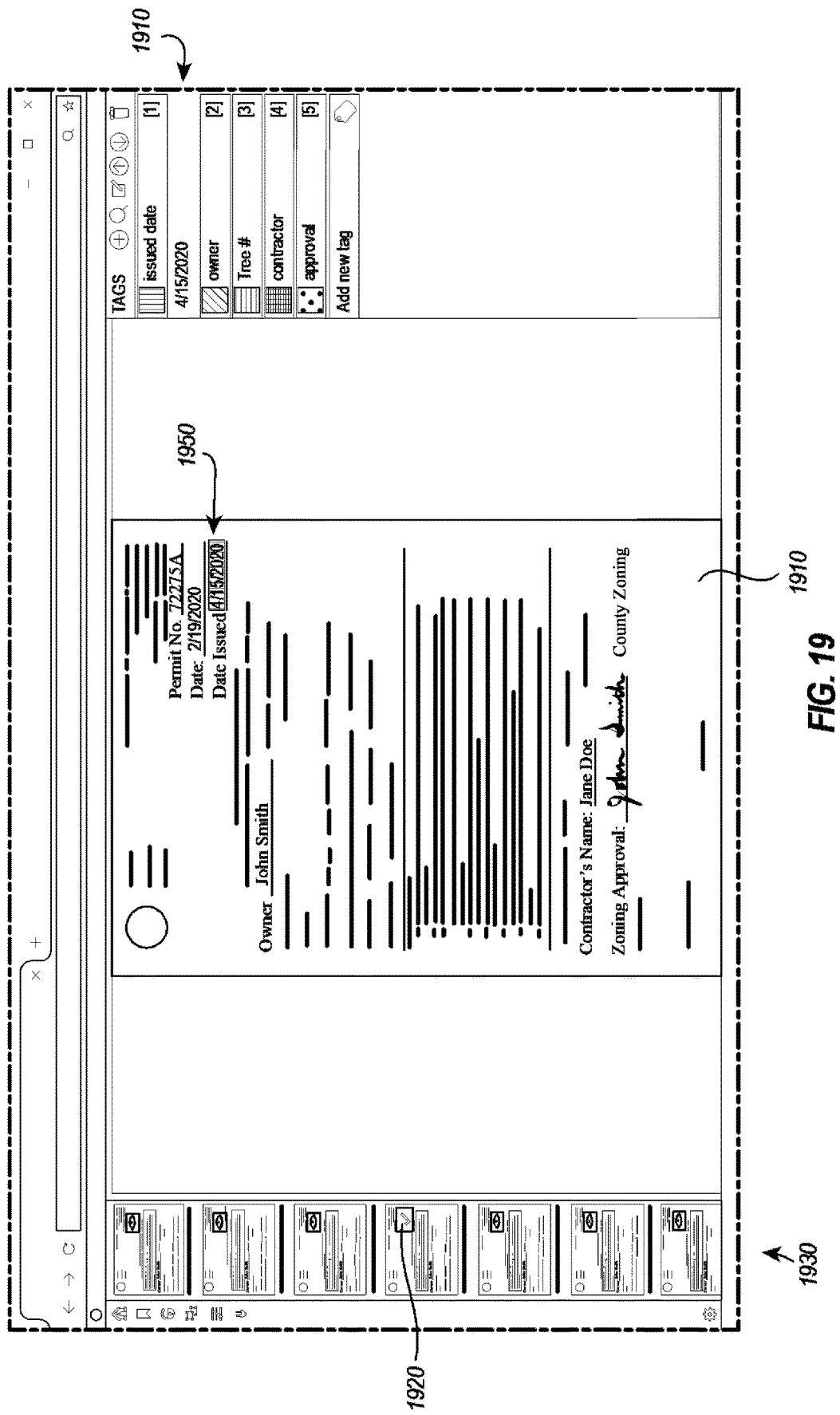

FIGS. 18 and 19 illustrate an example in which a user selects a key to use for labeling of corresponding content for creating key-value pairings of ground truth. In this example, a user has selected the issued date key 1810 from the key control panel 1820 (e.g., by clicking on it and/or by entering the shortcut key "1") to activate that key (i.e., 'issued date') for use in labeling the form that is presently selected for labeling (e.g., the form 1850). Then, either the system automatically identifies content in the form that matches the key attributes for the selected key, as discussed earlier, and/or the user manually selects content in the form having the value to associate with the key for that key-value pairing of ground truth. In this instance, the user has selected the date value (10-11-18) in the form that corresponds to the key ('issued date') by entering touch input with a touch screen on the form after activating the key ('issued date') or by using a mouse select function to highlight the corresponding value in the form. By selecting this value in the form, the system links the selected value to the corresponding key (issue date). Then, the selected value can also be reflected near the key, as shown in line 1910 of FIG. 19. This is useful to validate to the user that the desired content has been selected and linked for the key-value pairing of ground truth.

In some instances, the linking between the key and selected value will occur whenever the user selects the data/value from the form. In other instances, the user must press enter or enter another input to lock in and record the key-value pairing that is stored as ground truth.

Additionally, if/when it is determined that some of the OCR characters in an uploaded form are determined to be incorrectly presented (due to bad OCR processing or data entry into the form, for example), the user can also identify and edit this erroneous data, to correct it before it is linked as a key-attribute pairing used for ground truth. For instance, if the value in a form for a key comprising a particular date were to display the value or data of that date as "3/ii/98" due to an error in OCR processing that changed the number eleven (11) to two "i's", the user can edit this data in the value pairing via the key control panel 1720, for example, by right clicking on the data/value that is presented under the corresponding key when the system identifies the data as corresponding to the selected key and to change it to an editable form.

Other techniques for selecting and changing the data into an editable form are also acceptable, such as menu interfaces and the selectable key controls that are presented on the interface. The user can also make similar edits by directly editing the content on the form. Regardless of where the changes are made for updating the key values, the change can be propagated and saved on the form and/or the key-value pairing that is used for ground truth. Additionally, this change can be used to score lines, cluster forms, tune and/or train the models that are used for generating OCR forms from image data and/or for applying the trained models to other forms with potentially similar content issues.

Figure 20:
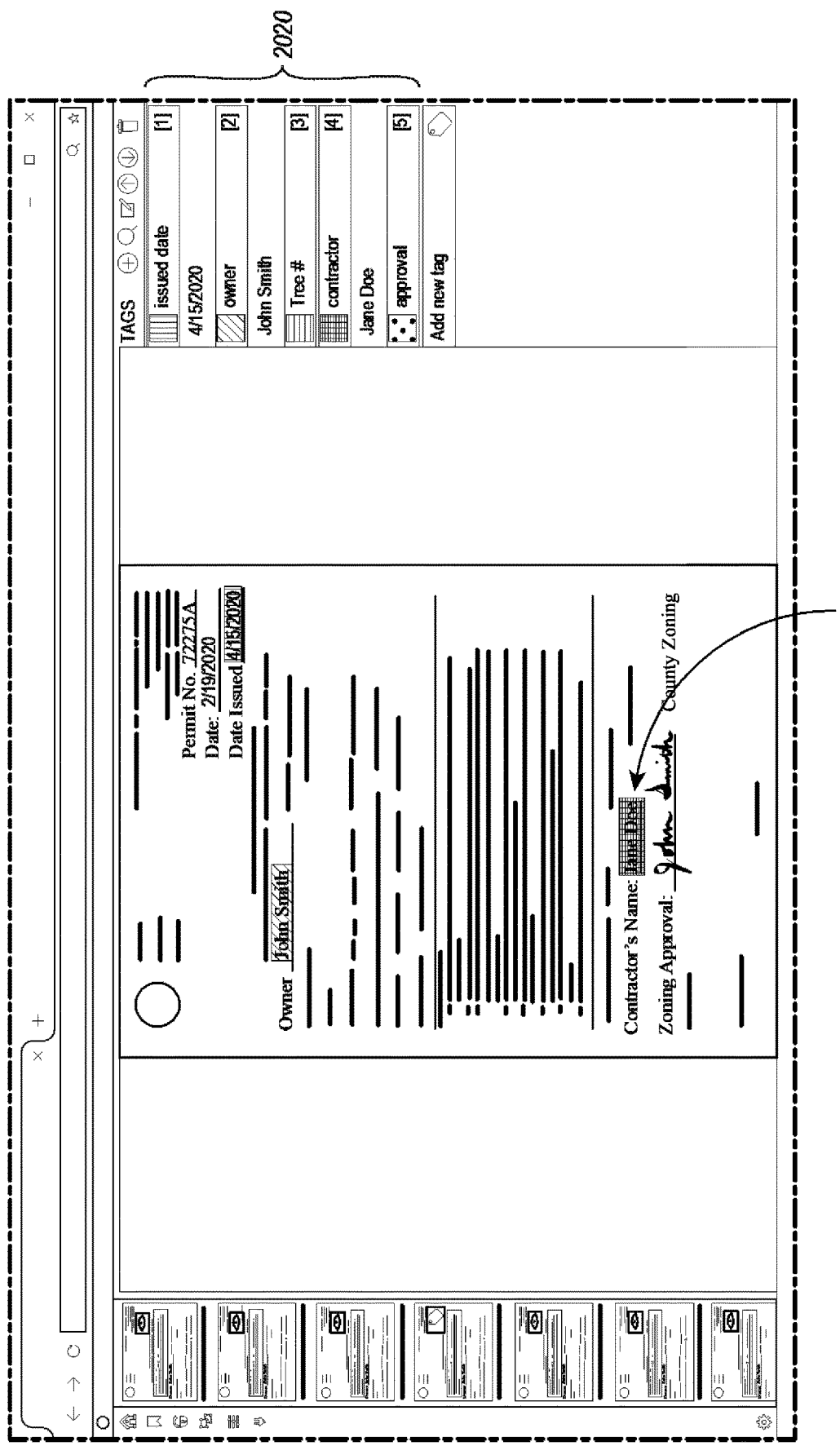
Figure 21:
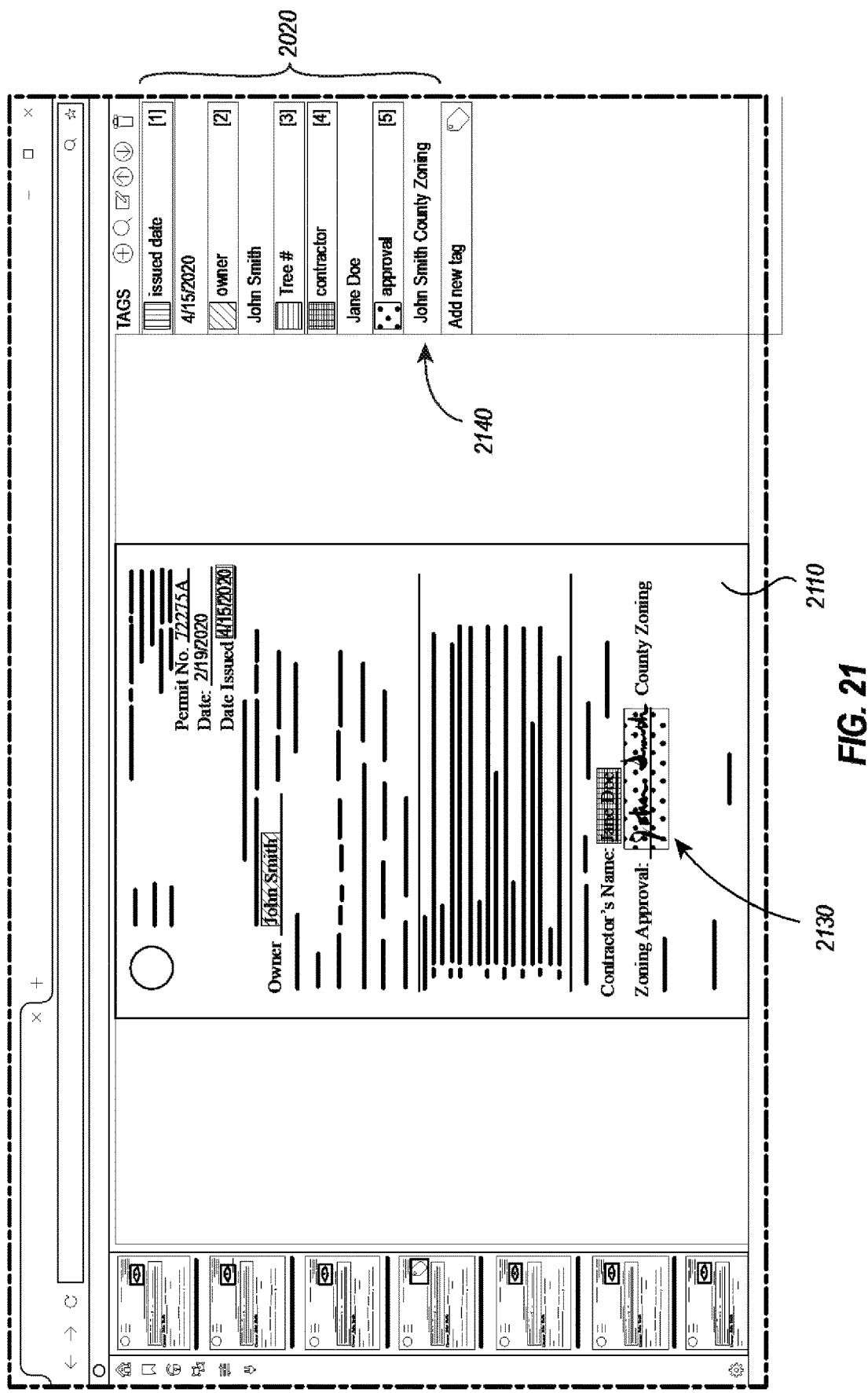

FIGS. 20 and 21 show additional key-value pairings being made, in similar fashion. Notably, once a key-value pairing is made/confirmed, the key-value pairing can be reflected in the key control panel 2020 in which the value of the key-value pairing that is selected is reflected immediately below the key it is linked to. For instance, the issued date and owner values are locked in at FIG. 20. But, the contractor value is not yet locked in at FIG. 20, but it is at FIG. 21. It was not locked in yet in FIG. 20, since the user was still in the process of selecting the text/content of the form to link as the value to the contractor key. FIG. 20 shows some of the content being selected (2030) from the form for the contractor key. But, the user had not yet submitted it (e.g., had not fully selected the content and hit enter).

Notably, the key names do not need to match what it says in the form. For instance, the 'approval' key (2140) corresponds to the descriptor Zoning Approval in the form 2110. However, when the user selects this pairing (e.g., the user selects the signed name (2130) for the Zoning Approval within the form), the system will use this ground truth to find similar correlations for approval look-ups in other forms when the trained model is subsequently applied to the other forms.

Figure 22:
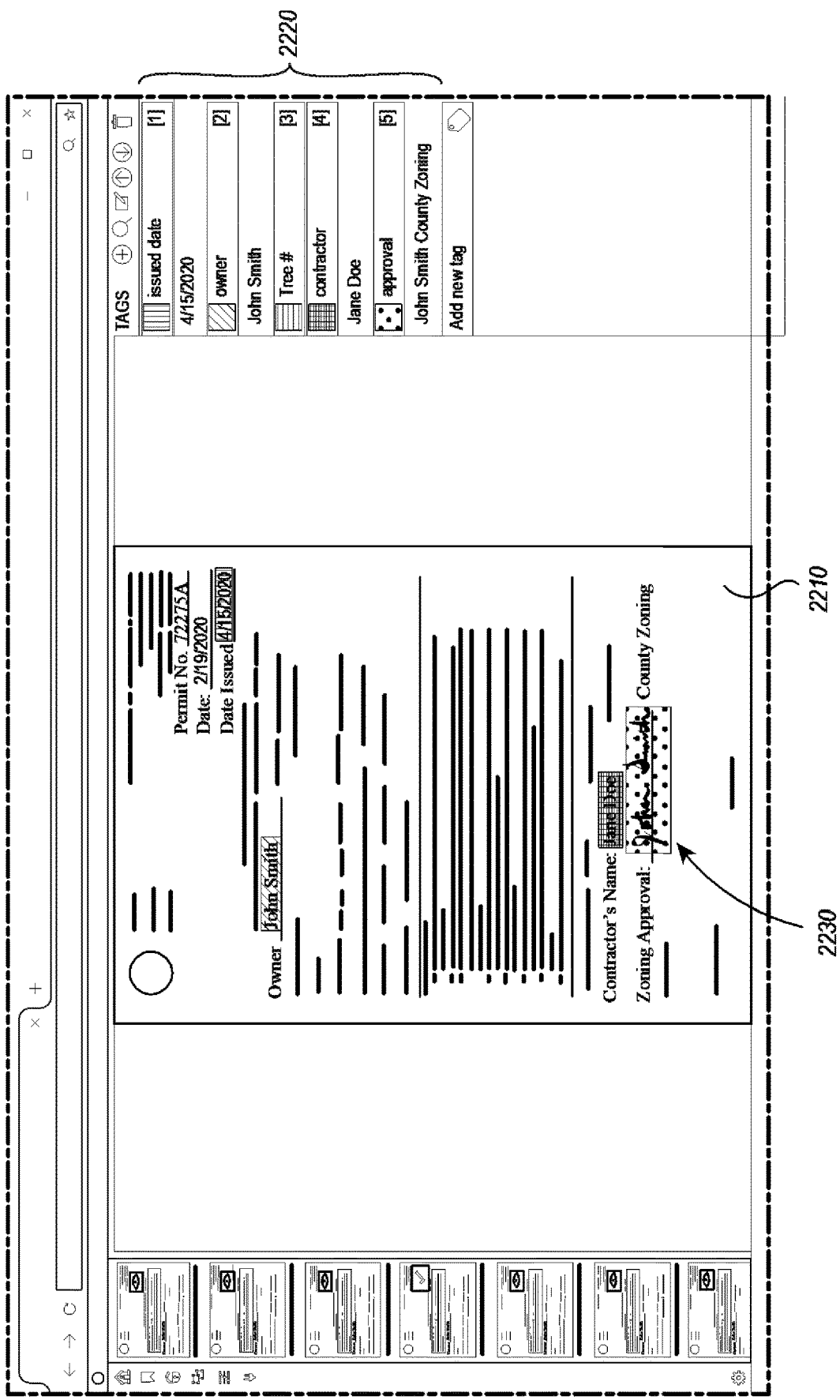

After the user selects this value for the key, it is reflected in the key control panel 2220, as shown in FIG. 22. The corresponding value/content is also reflected in a highlighted state in the form 2210, to reflect it has been selected and linked to the key. In some instances, this is shown, for example, by using a similar highlighting (e.g., coloring, texturing or other highlighting) that matches a same highlighting used in the key control panel 2220 for the linked key(s). For instance, the issued date key in the key control panel 220 may have a first highlight type that matches highlighting applied within the form 2210

In some instances, such as shown in FIGS. 19-24, the thumbnail status icons in the thumbnail view are updated once a corresponding form undergoes labeling (either completely or when it starts being labeled) with the key-value pairing processes just described. For instance, as shown in FIG. 19, the icon 1920 on the corresponding thumbnail image of the form, which is shown in the thumbnail view 1930 is updated to reflect the status of the form 1910 as being at least partially labelled. The updating of the icon may be as simple as changing a color of the icon and/or by replacing the icon with a different status icon.

Figure 23:
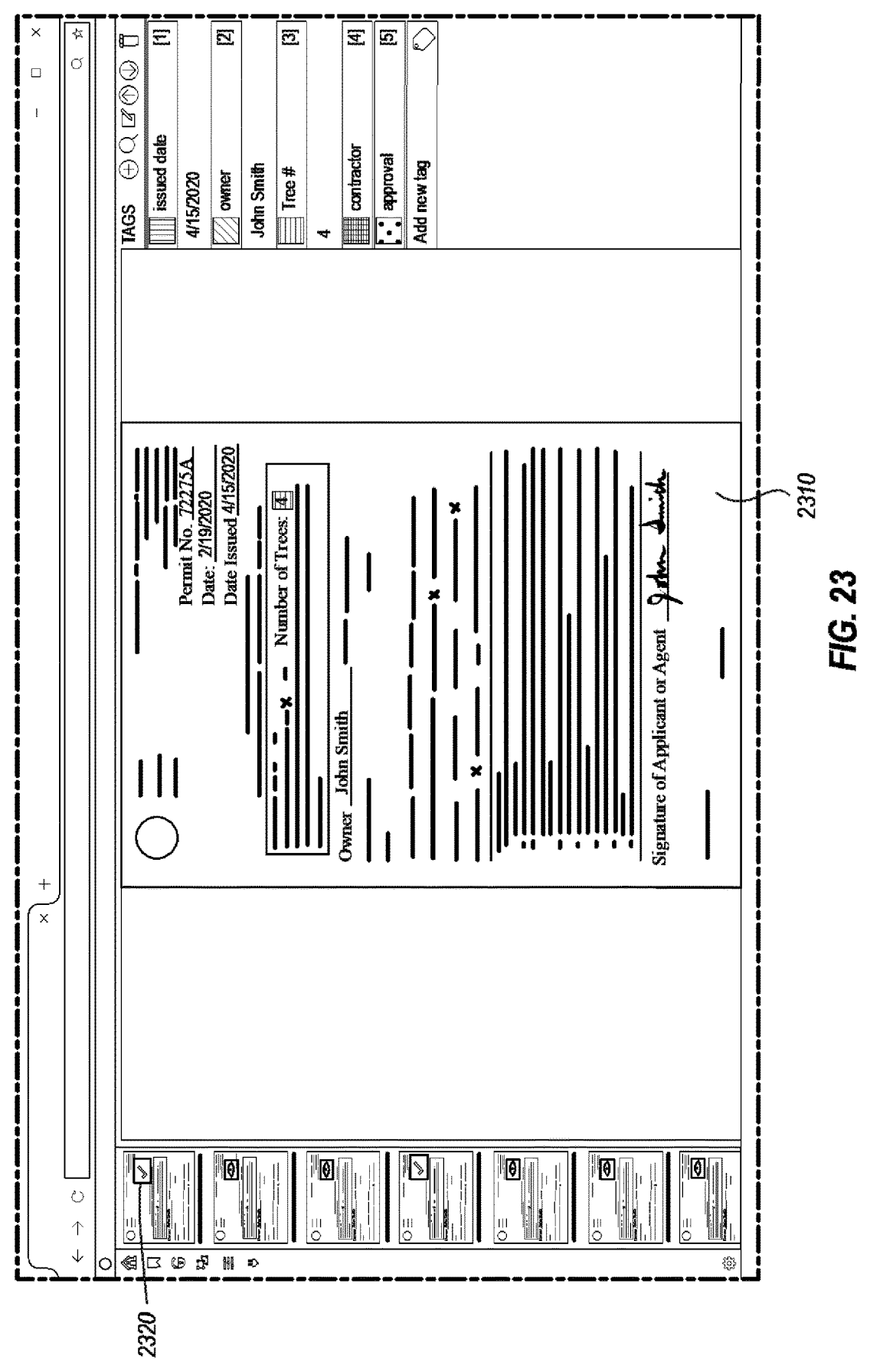

FIG. 23 shows additional updating of status indicator 2320 to reflect the status of the newly labeled form 2310 (shown in the single form view frame) having undergone labelling.

Figure 24:
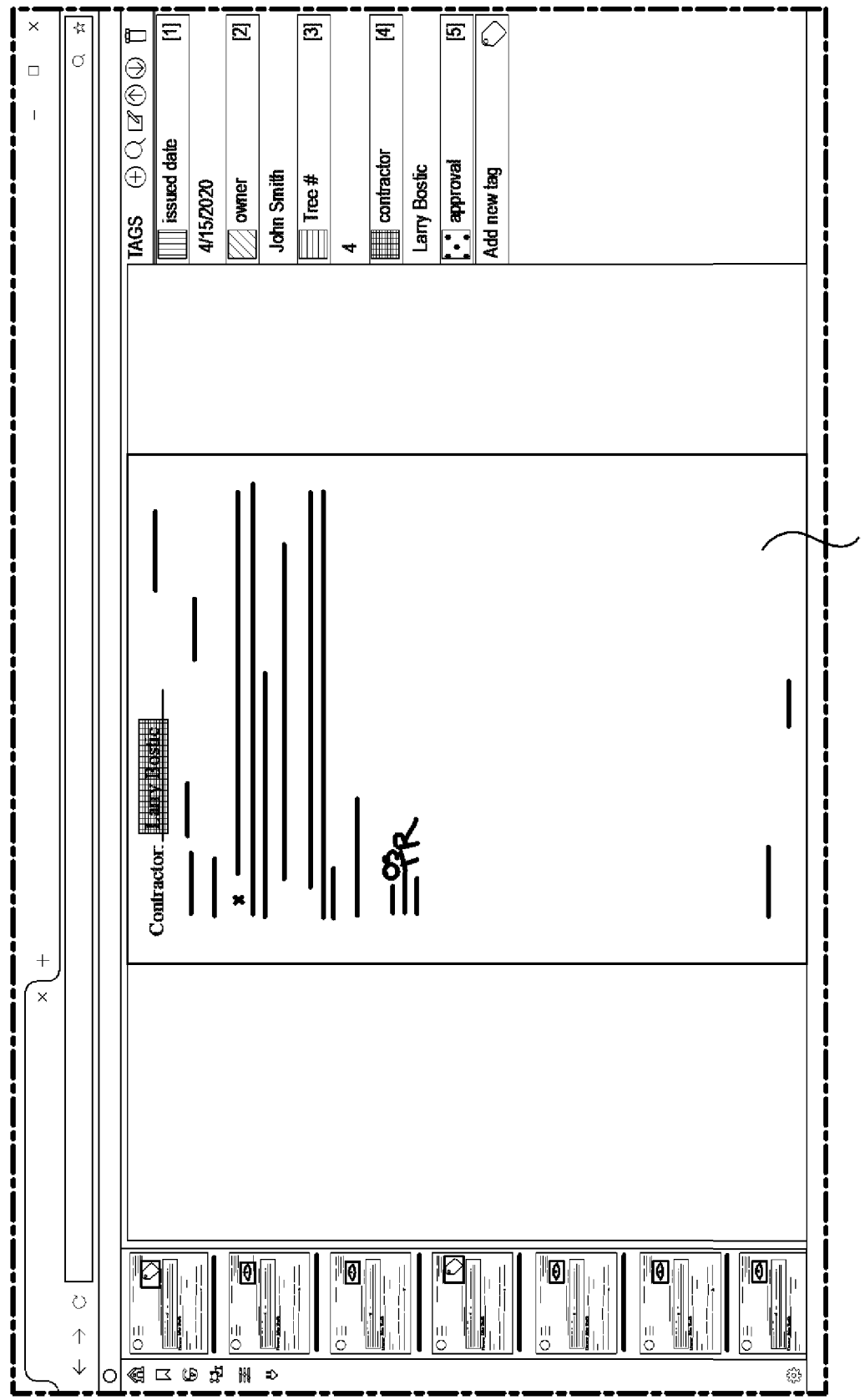

FIG. 24 illustrates how a form may have multiple pages that a user can navigate for labeling. For instance, the user can select a key to be labeled and then select in the document and scroll through multiple pages (using traditional scrolling techniques) to identify and then select the value for that key. In this embodiment, form page 2 (2410) is a second page of a form 2310 that the user scrolled to during the labeling processes.

Once all of the selected/desired forms from the set (shown in the thumbnail view, for example) have been labeled with all of the keys that are desired, the system can use the labeled key-value pairings as ground truth for further training the model. The model that is trained, notably, can comprise any machine learning model that is capable of evaluating and being trained on the key-value ground truth and other ground truth discussed before, such as relative positioning of value data in the form to other form features.

Examples of machine learning models that can be used include linear regression, logistical regression, random forest, gradient boosted trees, neural networks, naïve bayes, nearest neighbor, and so forth.

Figure 25:
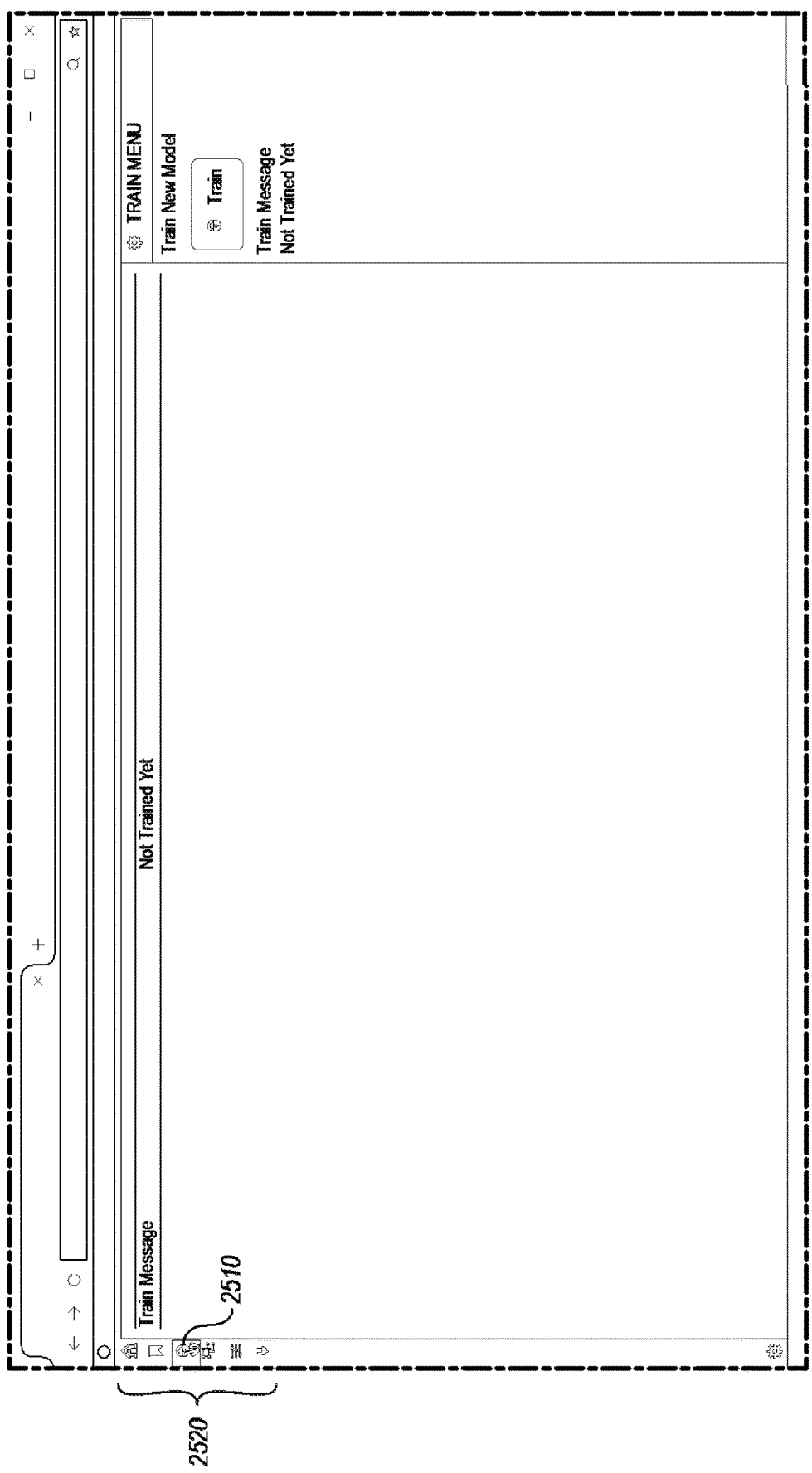
FIGS. 25-26 illustrate various non-limiting examples of interfaces that can be used for training a model based on ground truth identified with the other interfaces described herein.

A user is able to trigger the training with the ground truth by selecting a training control (currently shown in a training model control panel 2520), as shown in FIG. 25. During training, the system accesses the stored key-pair ground truth that is stored by the system for each key-value pairing labeled by the user, along with the other ground truth (e.g., positioning, anchors, and other features for the values/forms) discussed above. The system can then make a determination as to a relative confidence in the accuracy in which the system will be able to use this model to identify corresponding key-value pairings in related forms from the related cluster and/or any particular grouping of forms based on the stored analysis of those clusters/groupings relative to the training that is completed.

Figure 26:
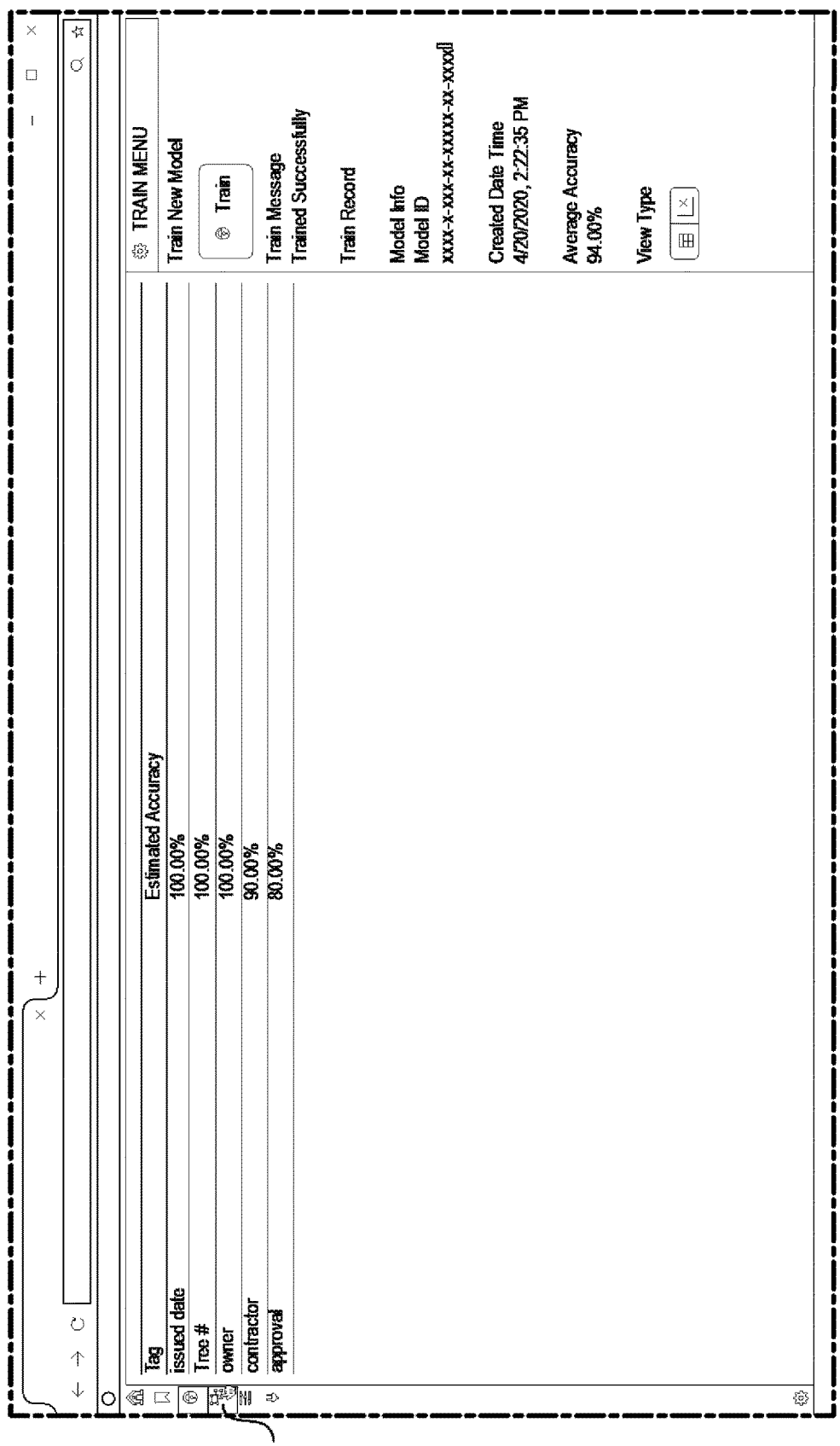

The corresponding accuracy estimation can be made granularly for each key used during labeling, and can be displayed to the user on an interface, as shown in FIG. 26, for example, at the conclusion of the training (either automatically at completion and/or in response to a user navigating a menu accessible from one of the controls to get to the information). If the percentages are too low, the user can select and apply new labeling to additional forms to gather more ground truth key-value pairings to increase the accuracy of the model.

Figure 27:
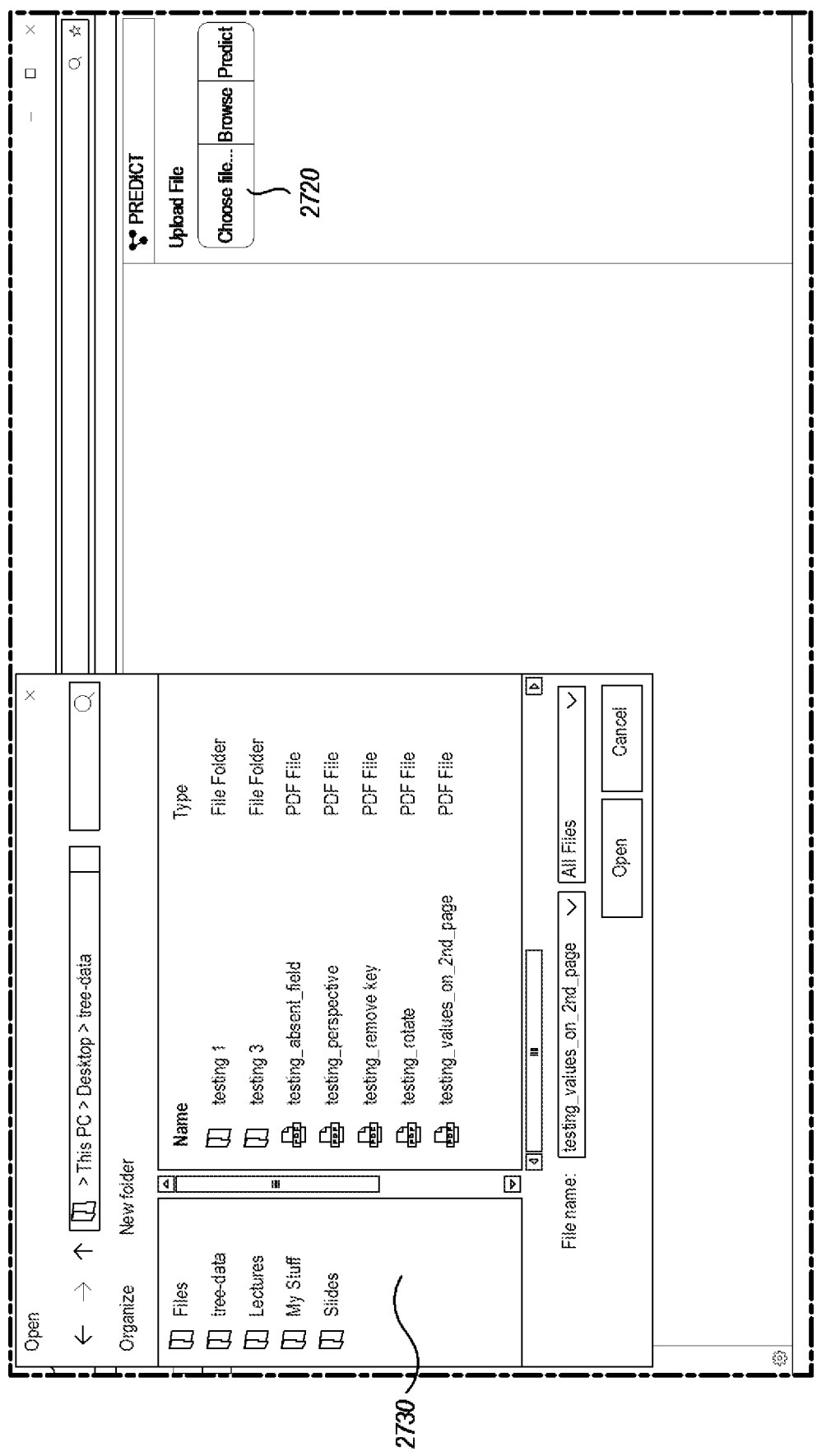

After training, the user can then use a corresponding interface to apply the trained model to a form that is selected from the cluster of related forms. For instance, as shown in FIG. 27, the user is selecting a form 2710 to upload and apply the model to. They can initiate this process and access the upload field 2720 (to type in the address of a particular form to apply the model to) and/or form selection pop-up 2730 (which identifies a plurality of forms that the model can be applied to) by selecting a menu control, such as control element 2610 of FIG. 26, for example. When selected, the system displays forms that are saved and available for processing with the trained model. The system identifies these forms from the clustering processes that were described earlier.

The user can select a single form or a grouping of a plurality of forms (e.g., an entire cluster or subset of forms) to apply the trained model to by entering in the address of the selected form or selecting the form(s) from the pop-up. In some instances, the user can also select limited subsections of particular forms to apply the model to, such as when the forms are segmented/saved into discrete subsections.

Figure 28:
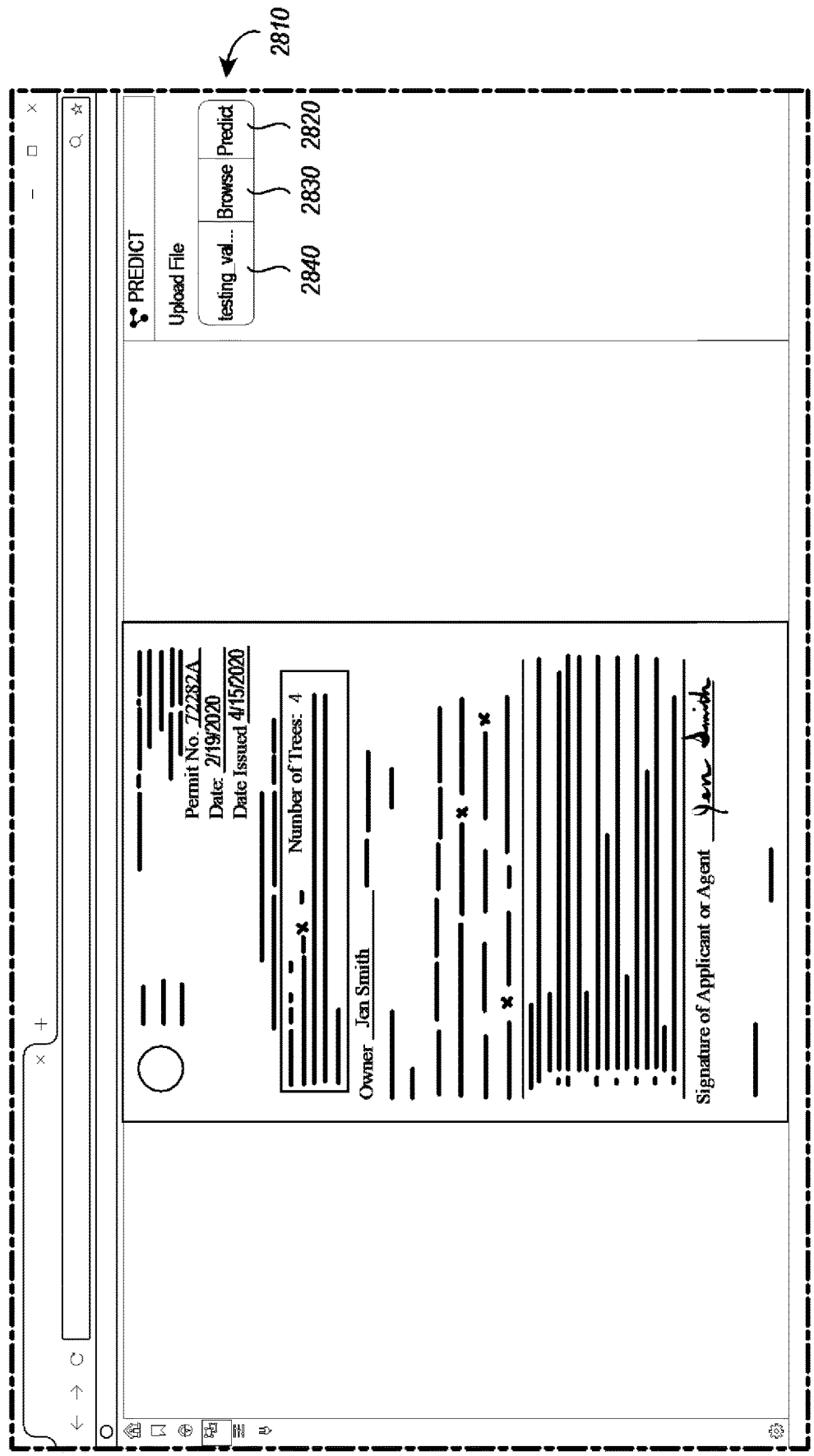
Figure 29:
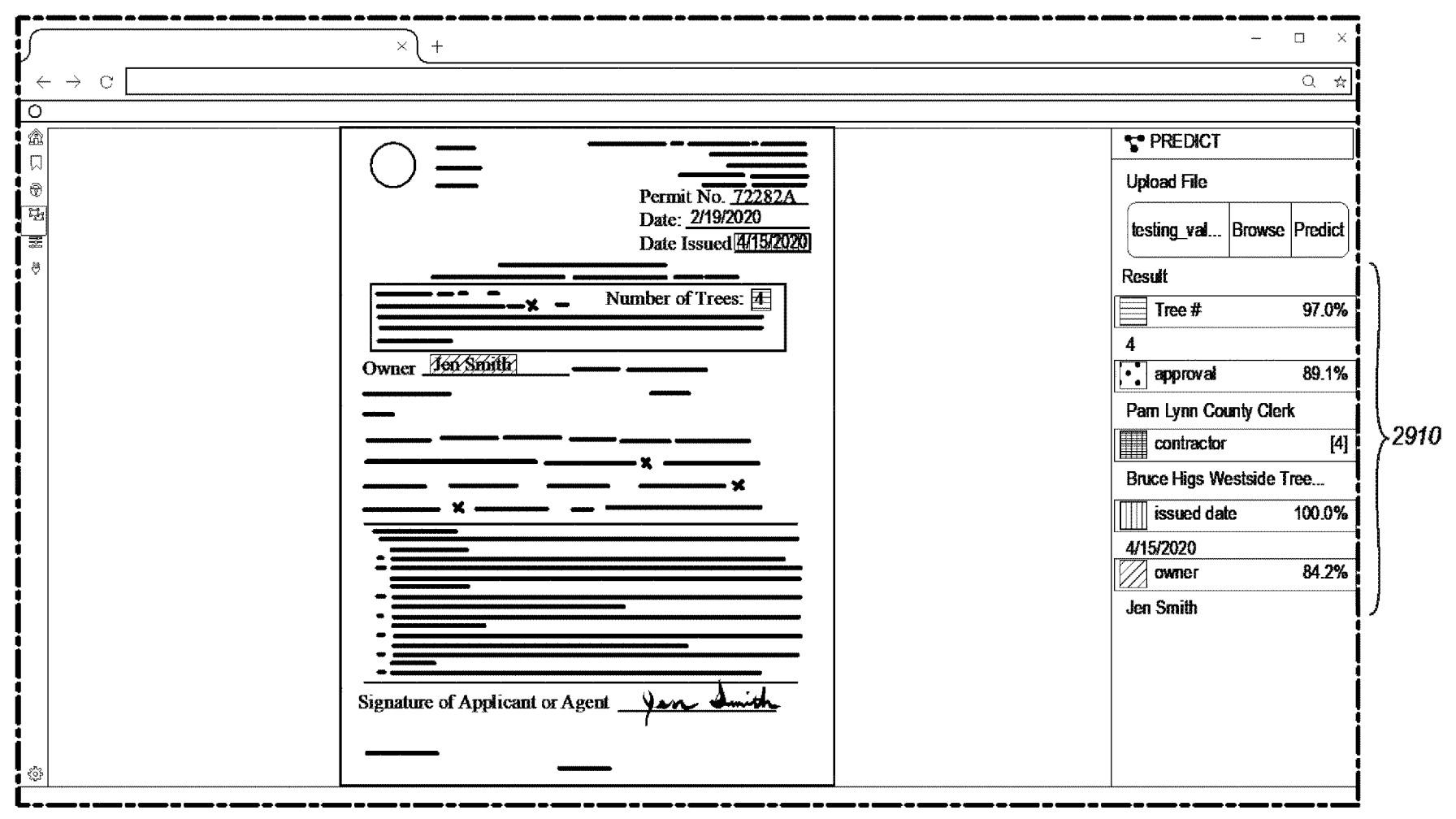

FIGS. 28 and 29 show a user entering/selecting a particular form (at form selecting control 2810) to run the trained model on to form a prediction/analysis of corresponding values for desired keys. By selecting the predict control 2820, the system will apply the model to the form(s) entered into the upload file field 2840. By selecting the browse control 2830, the user is presented with a pop-up listing of available forms to select.

Figure 30:
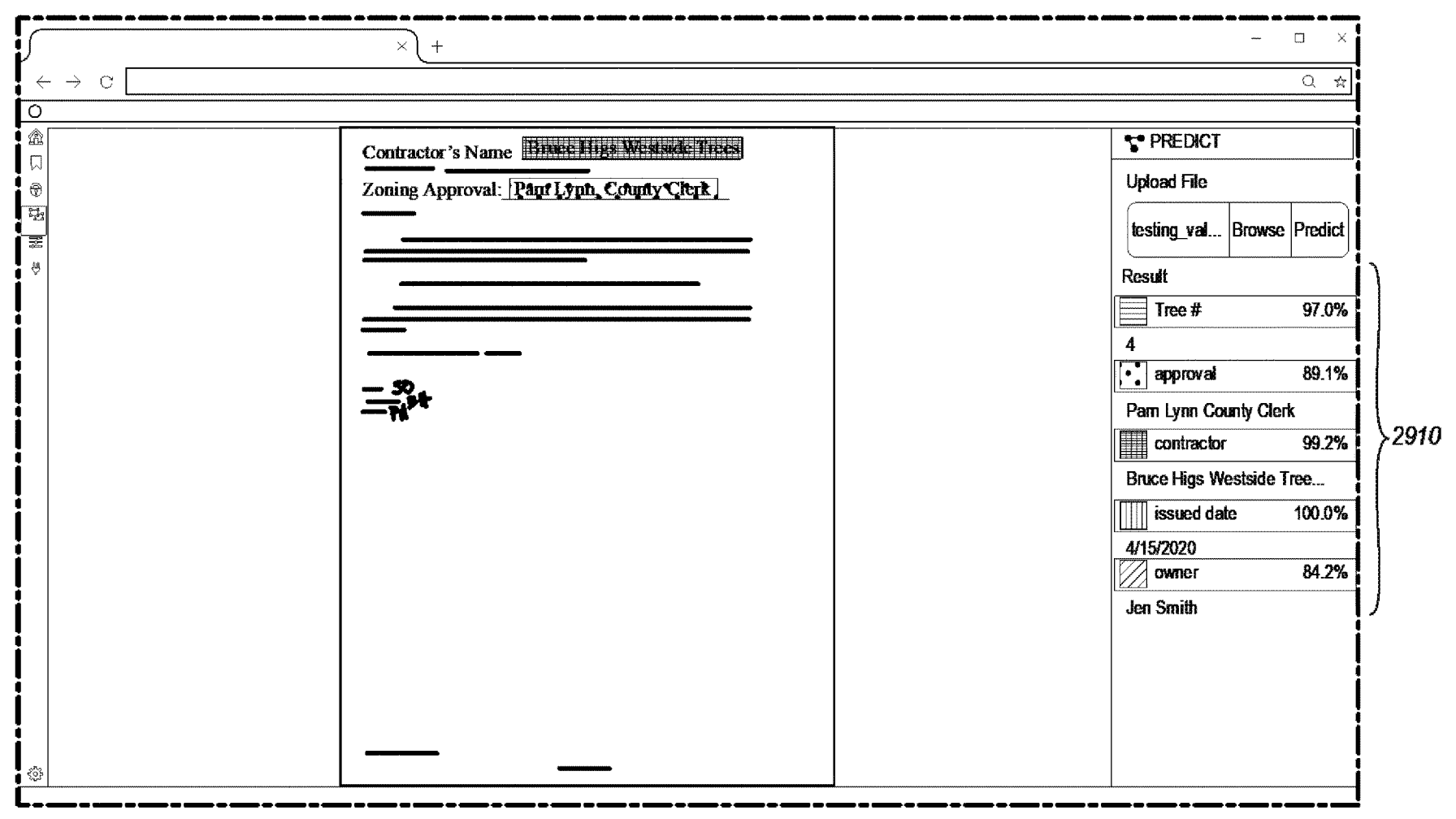

In FIGS. 29 and 30, the different values in the form that the model was applied to are visually identified within the form with highlighting. This highlighting may be a color highlighting that matches a color assigned to the key and/or a particular icon, font, animation or other graphical attribute that intuitively lets a user know what key (on the right) corresponds to which identified value in the form. The value may also be replicated/identified in the key frame (e.g., top right of interface) directly below the corresponding key.

In some instances, the confidence value or accuracy estimation value for a particular value that is identified in the form as corresponding to a particular key will be reflected in the key frame. This is shown in the key control panel 2910 of FIGS. 29 and 30, for example.

Sometimes, the value of the key, as contained in the form is not present on the form or highlighted on the form until the user navigates to that page on the form (e.g., page 2 shown in FIG. 30). In other instances, the interface provides a multi-page view to show all highlighted values.

Figure 31:
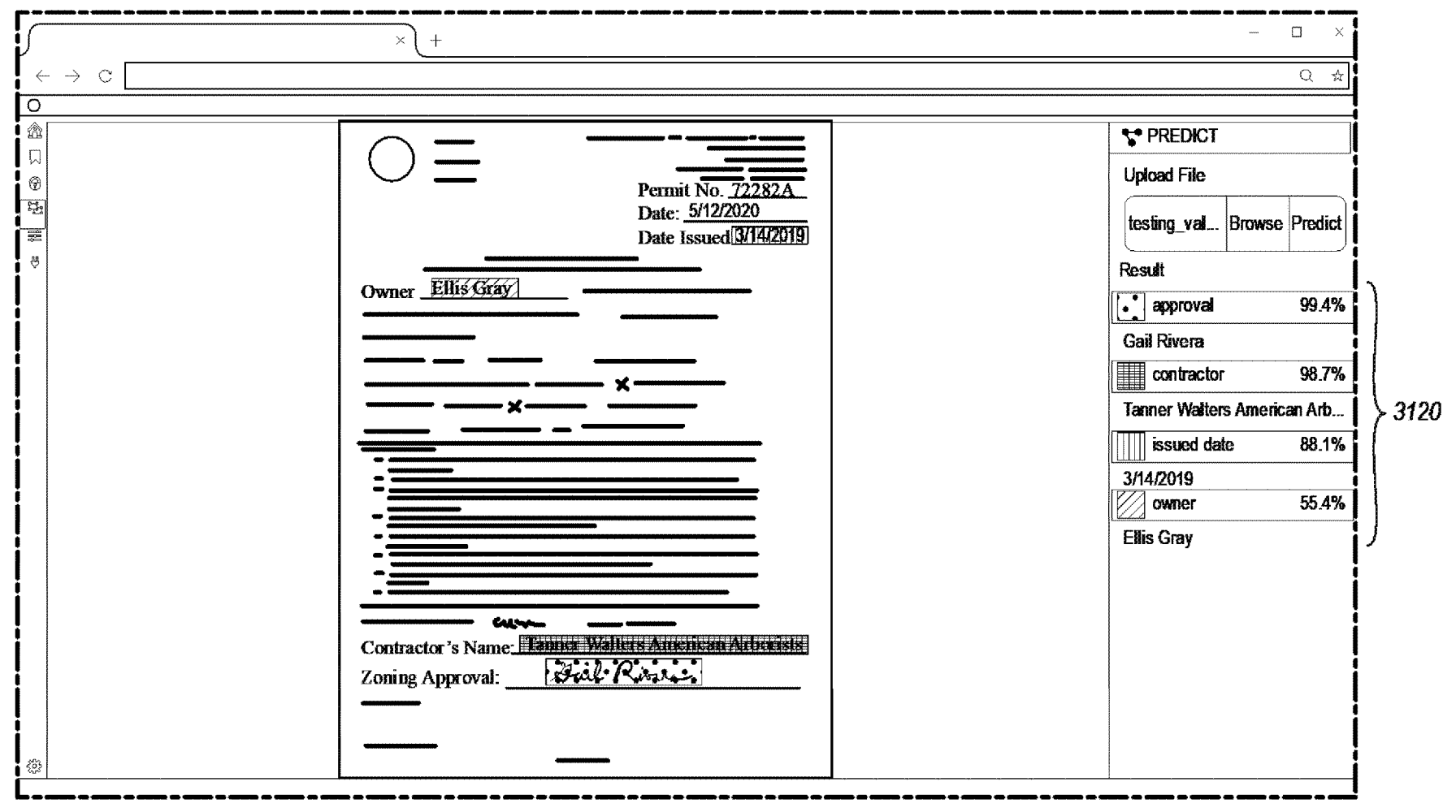

FIG. 31 illustrates another example of a processed form that the trained model has been applied to identify desired key values in that form. Notably, in this example, the system has identified that the key values for a desired 'tree' key is not present in the form. This key was shown in the key control panel 2910 of FIG. 29, a related form, however. But, the system/interfaces have intelligently omitted that key from the key control panel 3120 presentation that is rendered to the user, so as to rendering the matching key-value pairings reflected in the key control panel 3120 in a more concise manner.

Figure 32:
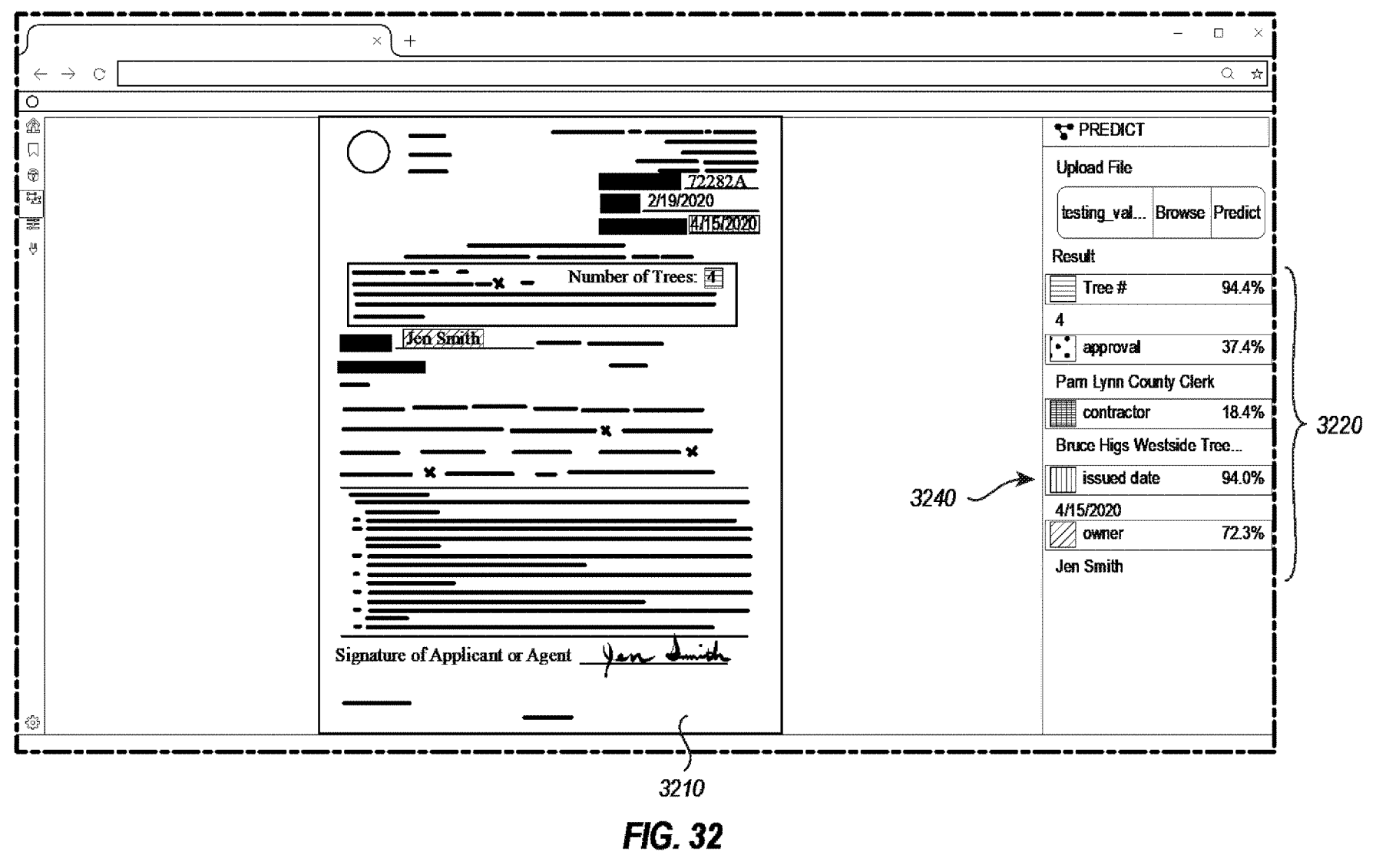

In FIG. 32, the form 3210 that is undergoing processing by the trained model is determined to be missing or omitting terms (e.g., values) that would be required by the system to find a key-value match, based on the trained model and key attributes that are looking for values having particular attributes. However, notwithstanding that certain terms are missing in the form due to OCR processing errors and/or other processing errors, it is possible to identify corresponding values in the form. This is because the model being used to process the form has been trained with ground truth that comprises key-value pairings, as well as the relative positioning of values and other anchors within the form and/or based on other form attributes. This additional information from related forms enables the system to discern similarities between the forms because they have been clustered based on other similarity attributes.

Based on the similarity information between the forms in the same cluster, the system is able to determine that a new form undergoing processing with the form analysis model will have the same or similar attributes of the keys in the forms, since the forms come from the same cluster. In particular, a key in one form of the cluster will likely correspond to another form (such as this form 3210) in the same cluster. Accordingly, the system can use this information to identify the corresponding location and value for the key in this form 3210 and can be presented to the user with a particular confidence of accuracy that it corresponds to a particular key in the form, based on similar correlations of related forms in the same cluster.

The foregoing functionality can be particularly helpful for situations when the scan/image of the form is smudged or of poor quality. For instance, in the present example, the form 3210 is similar to the previous forms shown in FIGS. 19-23 and 28-31, from the same cluster. Accordingly, the system can determine, based on anchors of the forms that define positioning of particular form features and values, that the omitted text in form 3210 (shown by box 3230) is the same as the text in the related forms that recite "Date Issued:" in the same location on the form. Based on this information, the system can then determine that the corresponding value for that content should be selected for pairing with the corresponding 'issued date' key 3240 shown in the key control panel 3220.

This functionality can also be used to identify misaligned or variable perspective views of forms. For instance, In FIG. 33, the system can use the trained model to identify corresponding values for the desired keys in the form 3310, even though this form 3310 has been scanned in a misaligned orientation relative to other forms from the same cluster. This discrepancy can be mitigated, as discussed above, by identifying relative positioning of values to the anchors in the form (e.g., form edges, corners, lines, boxes, etc.) and by making inferences of the form being in a same cluster as other forms having the same values and relative positioning between values and the form features.

FIG. 34 illustrates an example flow diagram 3400 of a process for rotating a form to address alignment issues when presenting the form. As shown, the system first runs an OCR on the form to obtain the majority of text that it can with the skewed rotation (3410). Then, the system rotates and/or adjusts the view of the form (3420) to compensate for the alignment issues, by rotating the form until lines in the form are of a similar orientation to other forms in the same cluster (3430).

The system may dynamically rotate the form in visual presentation to the user as an animation of the rotation, prompting the user to approve or reject the new orientation of the form, based on the rotation, and/or until the user stops the rotation by providing input, such as a stop rotating command by selecting a displayed icon for stopping rotation (not shown).

Once the user accepts the rotation and new orientation, by selecting an approve control (not shown), the system saves the form with the new orientation as a new form file in the same cluster. The system may also overwrite the previous file for the form, so as to avoid duplicate copies of the form. Alternatively, the system may save both copies.

If the user does not approve the rotation and new orientation of the form during the rotation process, the system will continue to make additional rotations and modifications to the image of the form, either automatically and/or in response to user input that specifies additional modifications to make (e.g., input specifying how much more to rotate the form in a particular direction) until the user stops the rotation and/or until the system independently determines that the form has a similar orientation to other forms in the cluster.

In some embodiments, the system will iteratively scan and analyze all of the forms in a particular cluster to determine that they have a similar orientation within a particular variation in rotation tolerance threshold. If not, the system will continue to identify and present the user with forms from the cluster that are misaligned relative to the other forms (e.g., forms that are determined to be outside of the variation in rotation tolerance threshold to a particular standard for the cluster). Then, the user can provide input for rotating the forms that are misaligned, as previously described. Alternatively, system can automatically adjust orientation of the forms, without user input, to ensure that all forms within a particular cluster are within the rotation tolerance threshold (e.g., within a predetermined % of orientation) of the particular standard for the cluster. The standard can be established by a user providing input that selects a particular form that is acceptable and that is used as the standard.

Figure 35:
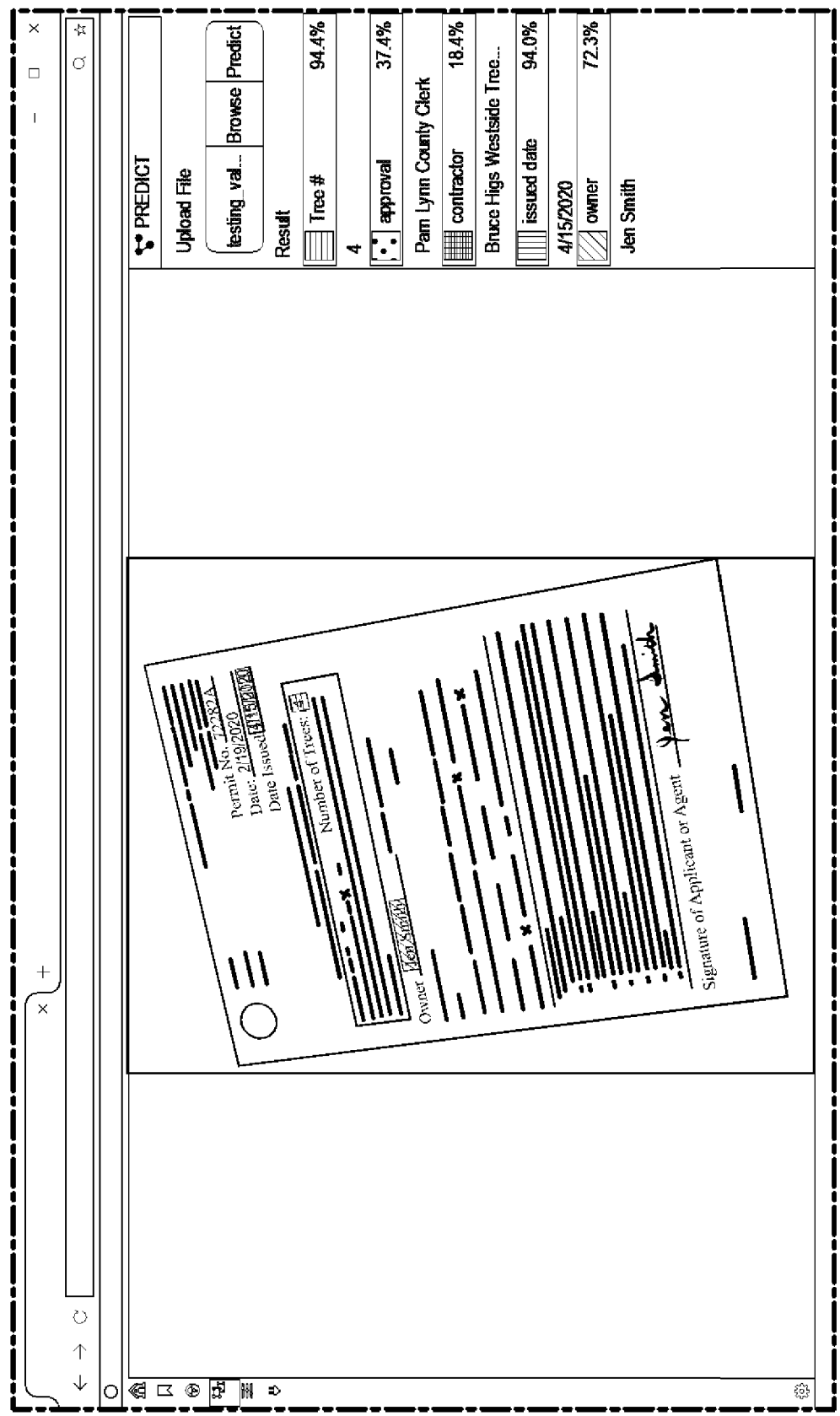

FIG. 35 illustrates an example of a form having values in the form being identified for keys in the form 3510 that has been processed by the model and in which the form has a different perspective view (e.g., a camera perspective). Similar processes can be applied here, as described above, to identify the values for keys, even though they may be in different absolute positioning on a processed form, but a similar relative positioning to the trained key-value pairings and other anchors within the forms used for training the model and/or within similar clustering to other forms that are presented/saved with different perspective views. Similar processes described in reference to FIG. 34 can also be used to stretch and/or modify the view of the form 3510, such that it will be modified and saved with a similar form presentation view as forms used to train the model and/or that are processed by the trained model. Even more particularly, the system will rotate, scale, stretch or otherwise modify the form 3510 to compensate for different image features/attributes (during the processing of the trained model to a particular form and/or during the training of the model with similar or related forms from the identified cluster) so that the system can adequately identify the relative pairings between the value locations on different form and the relative positioning of the values to other form features, as the ground truth (or supplemental ground truth) that is used by the model to making the subsequent identifications on misaligned, skewed, blurry, stretched and/or alternate perspective forms.

In alternative embodiments, the system may also make image changes to a form having such image anomalies prior to training the model with the set of selected forms, as well as to any selected form suffering from the anomalies prior to applying the trained model to the form, to avoid having to track positioning and imaging information as ground truth or having to train the model for such ground truth relative to the corresponding values.

Figure 36:
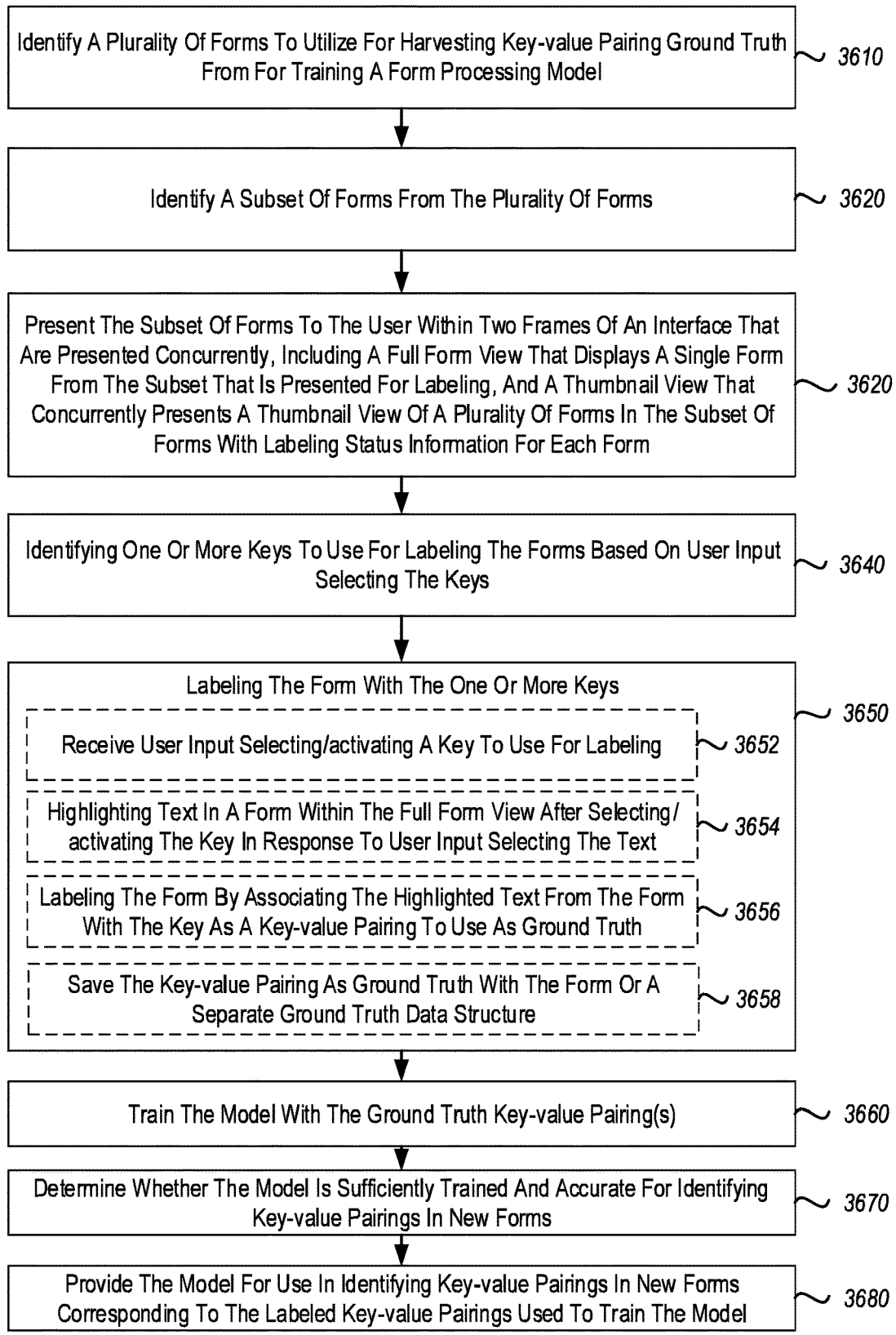
FIG. 36 illustrates a flow diagram of acts associated with identifying and labeling forms with key-value pairings that comprise ground truth for training a model to be used for identifying corresponding key-value pairings in other forms.

Attention will now be directed to FIG. 36, which illustrates a flow diagram 3600 of various acts that may be implemented by a computing system to perform methods with the processes described herein for selecting ground truth for training a model with key-value pairings for form processing, as well as methods for using the trained model to process related forms to identify correlating key-value pairings within the related forms.

As shown, the flow diagram 3600 includes an act of the system identifying forms to use for harvesting/obtaining key-value pairing ground truth from (act 3610) and that will be used to train the form processing model described herein. This act may include the aforementioned processes of identifying a plurality of forms and clustering the forms to identify a cluster of forms having similar attributes. These attributes may include a form source, a form type, a form author, a form size, lines within a form and/or any other form clustering processes and/or form analysis described herein.

Next, the system identifies a select subset of the forms in the cluster to be used for selecting ground truth to train a model (act 3620). This process may include identifying a predetermined percentage of the initial plurality of forms that are identified and/or a predetermined percentage of forms in a specific cluster of forms. (e.g., 5%, 10%, 20%, 30% or another percentage).

This act (act 3620) may also include identifying a predetermined quantity of forms (e.g., 5, 10, 20, 30, 40, or another quantity of forms).

In some instances, act 3620 includes processes for prioritizing and/or sorting forms within a cluster to identify a subset of forms having a particular set of attributes (e.g., percentage of completion, scan quality, source, variety between other forms in the cluster, etc.).

Then, the system uploads and presents the subset of forms to the user (act 3630) to use for labeling the key-value pairings for those forms. In some instances, the forms are presented within an interface that displays both (1) a full form view of a single form from the subset that is presented for labeling, along with (2) a thumbnail view or listing of other forms in the subset of forms (act 3630).

In some instances, the thumbnail view displays a thumbnail view of all or at least a plurality of forms in the subset of forms along with labeling status information for each form in the thumbnail. The status information reflects whether the corresponding form has been labeled or, alternatively, whether the form has not yet been labeled. The uploading and presentation of the forms may also include any combination of the aforementioned processes for scanning, parsing, OCR processing, anchor identification, line scoring and other processing described herein.

The form presented in the full form view can default to a first form from the subset and can be switched to any form the user selects from the thumbnail view. The status indicators on the thumbnails help the user to know which forms still need to be processed for training.

In some alternative embodiments, the system omits the thumbnail view and only presents the user a single form at a time from the subset and replaces the form that is displayed with a new form from the subset after a previously displayed form has completed the labeling processes described earlier.

The displayed flow diagram 3600 also illustrates acts for identifying keys to use for labeling the forms (act 3640) and labeling the form with the keys (act 3650). These processes were described earlier in reference to the interface figures in which a user provides input in a key entry field that matches a key in a predetermined key list. The system then autocompletes the key in the field, which the user can select for inclusion in a key control panel for labeling of the form(s). Then, when the user later selects the key from the key control panel, it is activated to use for labeling the form (3652). In particular, after activating a particular key, the user highlights or otherwise selects text in the form (3654) that is associated with the particular/activated key as a key-value pairing (3656). This label or key-value pairing is then saved with the form (as metadata, for example), or as an entry in a separate key-value pairing data structure that is stored with the form and/or as a separate data structure to be referenced when training the form processing model (3658).

After labeling the form, the ground truth key-value pairing(s) will be processed by the model to train the model (act 3660). Those of skill in the art are aware of different ways in which ground truth can be used to train a machine learning model and may vary depending on the type of machine learning model that is utilized. The scope of this invention applies to using the key-value pairings to train different types of models and is not limited to any particular type of machine learning model. In some instances, for example, the machine learning model is a recursive neural network. However, in other instances, different types of machine learning models are used.

After training the model, a determination is made whether the model is sufficiently trained and accurate, at least as to the level of confidence that a particular key-value pairing can be identified in a new form of similar attributes to those used for the training (act 3670). This may be accomplished, for example, by processing one or more forms from the cluster with the trained model and ascertaining whether the correct key-value pairing in the new form is identifiable. Statistical analysis provided by the processing of the model can also be used.

The confidence value may be used and compared against a threshold confidence value, in some instances, to determine whether to obtain additional ground truth from other forms in the cluster. For instance, if the confidence value for a particular key-value identification by the model falls below a particular desired confidence threshold (e.g., 80%, 70%, 60%, 50% or another percentage) the system will identify additional forms to use for obtaining additional ground truth from for improving the training of the model. These additional forms may be specifically identified from the same cluster or a different cluster to include forms that have variation in the values that correspond to the key-value pairing(s) associated with the confidence value(s) determined to fall below the particular desired confidence threshold.

Once the system determines the model is adequately trained for identifying key-value pairings in related forms for the labeled keys, the system provides the model to an interface for use in identifying key-value pairings in new forms (act 3680).

While the above Detailed Description describes certain examples of the technology, and describes the best mode contemplated, no matter how detailed the above appears in text, the technology can be practiced in many ways. Details may vary in implementation, while still being encompassed by the technology described herein. As noted above, particular terminology used when describing certain features or aspects of the technology should not be taken to imply that the terminology is being redefined herein to be restricted to any specific characteristics, features, or aspects with which that terminology is associated. In general, the terms used in the following claims should not be construed to limit the technology to the specific examples disclosed herein, unless the Detailed Description explicitly defines such terms. Accordingly, the actual scope of the technology encompasses not only the disclosed examples, but also all equivalent ways of practicing or implementing the technology.

What is claimed is:

1. A computing system configured to obtain and utilize a key value pairing ground truth to train a form processing model, said computing system comprising:
   one or more processors; and
   one or more hardware storage devices that store computer-executable instructions that are executable by the one or more processors to cause the computing system to:
   identify a plurality of forms to utilize for harvesting key-value pairing ground truth from for training a form processing model;
   identify a subset of forms from the plurality of forms, identifying the subset of forms includes scanning each form in the subset of forms to determine whether said each form has a particular orientation that lies within a rotation tolerance threshold, and, for misaligned forms whose orientations are outside of the rotation tolerance threshold, said misaligned forms are rotated to have the orientations of the misaligned forms lie within the rotation tolerance threshold;
   present the subset of forms within two frames of an interface, the two frames being presented concurrently, including presenting a full form view that displays a single form from the subset that is presented for labeling, and concurrently presenting a thumbnail view of multiple forms in the subset of forms with labeling status information for each form;
   identify one or more keys to use for labeling the multiple forms based on user input selecting the one or more keys;
   label at least the single form with the one or more keys in response to user input activating the one or more keys and further in response to receiving corresponding user input selecting one or more associated values from the displayed single form;
   save one or more key-value pairings particular selected keys and the corresponding user input as ground truth with the single form or a separate ground truth data structure; and train the form processing model with the ground truth, the form processing model trained to learn line breaks that are present within the forms included in the plurality of forms, where a line break includes a break point that separates a key from a value and where rules are established for adding the line breaks to the forms.

2. The computing system of claim 1, wherein the computing system is further configured to:
   determine whether the form processing model is sufficiently trained and accurate for identifying a related key-value pairing in one or more new forms based on whether the form processing model has a confidence value for identifying the related key-value pairing in the one or more new forms that meets or exceeds particular threshold confidence value; and
   if it is determined the form processing model is not sufficiently trained, identify a new set of one or more forms from the plurality of forms to obtain new ground truth key-value pairing data from based on a particular key-value pairing that falls below threshold of confidence of the form processing model for use in identifying a related key-value pairing in the one or more new forms, or else, when it is determined the form processing model is sufficiently trained, providing the form processing model for use in identifying the related key-value pairing in the one or more new forms.

3. The computing system of claim 1, wherein the thumbnail view includes presenting a separate icon with each thumbnail as the labeling status information that reflects whether the corresponding form has undergone labeling.

4. The computing system of claim 3, wherein the computing system is further configured to dynamically change at least one icon in at least one thumbnail image of the thumbnail view in response to labeling the form with the one or more keys to reflect that the form has been at least partially labeled.

5. The computing system of claim 1, wherein the identifying of the plurality of forms to utilize for harvesting key-value pairing ground truth from includes at least clustering the plurality of forms based on common attributes of the plurality of forms relative to other forms in the plurality of forms.

6. The computing system of claim 5, wherein the identifying of the subset of forms from the plurality of forms includes selecting a predetermined percentage of forms in a particular cluster.

7. The computing system of claim 1, wherein the identifying of the one or more keys to use for labeling the forms includes:
   receiving a predetermined listing of keys;
   receiving user input that matches a particular key provided in predetermined listing of keys;
   selecting the particular key based on the provided input; and
   associate a shortcut with the key for enabling selection of the key to activate the key for labeling the single form in response to user input selecting the key from a display of the key and/or from entering the shortcut.

8. The computing system of claim 7, wherein the computing system is further configured to:
   display a key control panel with the particular key concurrently with the two frames;
   receive user input selecting the particular key; and
   receive the corresponding user input selecting text from the single form, the text comprising the one or more associated values;
   highlight the selected text in the display of the single form.

9. The computing system of claim 8, wherein the computing system is further configured to:
   display the one or more associated values with the particular key in the key control panel.

10. A method for obtaining and utilizing key-value pairing ground truth for training a form processing model, the method being implemented by a computing system comprising at least one processor and one or more storage device having stored computer-executable instructions that are executable by the at least one processor to implement the method, the method comprising:
    the computing system identifying a plurality of forms to utilize for harvesting key-value pairing ground truth from for training a form processing model;
    the computing system identifying a subset of forms from the plurality of forms, identifying the subset of forms includes scanning each form in the subset of forms to determine whether said each form has a particular orientation that lies within a rotation tolerance threshold, and, for misaligned forms whose orientations are outside of the rotation tolerance threshold, said misaligned forms are rotated to have the orientations of the misaligned forms lie within the rotation tolerance threshold;
    the computing system presenting the subset of forms to the user within two frames of an interface, the two frames being presented concurrently, including presenting a full form view that displays a single form from the subset that is presented for labeling, and concurrently presenting a thumbnail view of multiple forms in the subset of forms with labeling status information for each form;
    the computing system identifying one or more keys to use for labeling the multiple forms based on user input selecting the one or more keys;
    the computing system labeling at least the single form with the one or more keys in response to user input activating the one or more keys and further in response to receiving corresponding user input selecting one or more associated values from the displayed single form;
    the computing system saving one or more key-value pairings particular selected keys and the corresponding user input as ground truth with the single form or a separate ground truth data structure;
    determining whether the form processing model is sufficiently trained and accurate for identifying a related key-value pairing in one or more new forms based on whether the form processing model has a confidence value for identifying the related key-value pairing in the one or more new forms that meets or exceeds particular threshold confidence value;
    the computing system, until it is determined the form processing model is sufficiently trained, identifying a new set of one or more forms from the plurality of forms to obtain new ground truth key-value pairing data from based on a particular key-value pairing that falls below threshold of confidence of the form processing model for use in identifying a related key-value pairing in the one or more new forms; and
    training the form processing model by causing the form processing model to learn line breaks that are present within the forms included in the plurality of forms, where a line break includes a break point that separates a key from a value and where rules are established for adding the line breaks to the forms.

11. The method of claim 10, wherein presenting the thumbnail view includes presenting a separate icon with each thumbnail as the labeling status information that reflects whether the corresponding form has undergone labeling.

12. The method of claim 11, wherein the method further includes dynamically changing at least one icon in at least one thumbnail image of the thumbnail view that indicates the single form has not been labeled, in response to labeling the single form with the one or more keys, to reflect that the single form has been at least partially labeled.

13. The method of claim 10, wherein the method further includes at least clustering the plurality of forms based on common attributes of the plurality of forms relative to other forms in the plurality of forms.

14. The method of claim 13, wherein the method further includes selecting a predetermined percentage of forms in a particular cluster to form the subset of forms.

15. The method of claim 10, wherein the identifying of the one or more keys to use for labeling the forms includes:
 receiving a predetermined listing of keys; and
 receiving user input that matches a particular key provided in predetermined listing of keys.

16. The method of claim 15, wherein the method further includes associating a shortcut with the key for enabling selection of the key to activate the key for labeling the single form in response to user input selecting the key from a display of the key and/or from entering the shortcut.

17. The method of claim 15, wherein the method further includes:
 displaying a key control panel with the particular key concurrently with the two frames;
 receiving user input directed at the key control panel for selecting the particular key; and
 activating the particular key for labeling of the one or more associated values.

18. The method of claim 17, wherein the method further comprises:
 receiving the corresponding user input selecting text from the single form, the text comprising the one or more associated values; and
 receiving user input modifying the one or more associated values that are associated with the particular key as the ground truth.

19. The method of claim 18, wherein the method further includes:
 displaying the one or more associated values with the particular key in the key control panel; and
 receiving the user input modifying the one or more associated values at the key control panel.

20. The method of claim 19, wherein the method further includes saving the modified one or more associated values with the particular key as a key-value pairing comprising the ground truth.

21. The computing system of claim 1, wherein execution of the instructions further causes the computing system to:
 cause the form processing model to further learn anchors for one or more types of forms, where an anchor is a fillable field that would appear if a particular form had not been filled in.

22. The computing system of claim 1, wherein, to ensure the form processing model has been adequately trained, the computing system:
 runs a prediction on unlabeled forms to select new forms from which new training data can be obtained,
 wherein, as a part of selecting the new forms, the system prioritizes forms that have a greatest variability from forms that have already been labeled.

* * * * *